United States Patent [19]

Ishikawa et al.

[11] Patent Number: 5,337,210
[45] Date of Patent: Aug. 9, 1994

[54] DRAWOUT TYPE SWITCH GEAR

[75] Inventors: Takayoshi Ishikawa; Shinsaku Yamasaki, both of Fukuyama, Japan

[73] Assignee: Mitsubishi Denki Kabushiki Kaisha, Tokyo, Japan

[21] Appl. No.: 945,259

[22] Filed: Sep. 15, 1992

[30] Foreign Application Priority Data

Sep. 19, 1991 [JP] Japan ............................ 3-75276[U]
Sep. 19, 1991 [JP] Japan ............................ 3-75312[U]
Sep. 19, 1991 [JP] Japan ............................ 3-75313[U]
Sep. 19, 1991 [JP] Japan ............................ 3-239055

[51] Int. Cl.5 .................................................... H02B 11/00
[52] U.S. Cl. ............................. 361/608; 200/50 AA; 200/308
[58] Field of Search ............. 200/50 AA, 50 A, 50 R, 200/51 R, 308; 361/331, 335, 336, 337, 338, 339, 340, 341, 345, 608, 609, 610, 615, 614, 647

[56] References Cited

U.S. PATENT DOCUMENTS

| 2,273,002 | 2/1942 | Mahoney | 361/337 |
|---|---|---|---|
| 2,885,502 | 5/1959 | Eichelberger et al. | 361/336 X |
| 3,578,925 | 5/1971 | Drown et al. | 200/50 AA |
| 3,710,044 | 1/1973 | Sharp | 200/50 AA |
| 4,011,424 | 3/1977 | Ericson et al. | 200/308 |
| 4,101,744 | 7/1978 | Wilson | 200/50 AA |
| 4,112,269 | 9/1978 | Nelson et al. | 200/50 AA |
| 4,121,067 | 10/1978 | Rexroad et al. | 200/50 AA |
| 4,176,262 | 11/1979 | McMillen et al. | 200/50 AA |
| 4,396,813 | 8/1983 | Hesselbart et al. | 200/50 AA |
| 4,412,112 | 10/1983 | Ishikawa et al. | 200/50 AA |
| 4,703,137 | 10/1987 | Bohnen et al. | 200/50 AA |
| 4,728,757 | 3/1988 | Buxton et al. | 200/50 AA |
| 4,743,715 | 5/1988 | Gerbert-Gaillard et al. | 361/337 X |
| 4,744,001 | 5/1988 | Krafft et al. | 200/50 AA X |
| 5,036,427 | 7/1991 | Krom et al. | 361/339 |
| 5,196,658 | 3/1993 | Gula | 200/50 R |

FOREIGN PATENT DOCUMENTS 0064184 11/1982 European Pat. Off. .
60-135011 9/1985 Japan .

Primary Examiner—Glenn J. Barrett
Attorney, Agent, or Firm—Burns, Doane, Swecker & Mathis

[57] ABSTRACT

In a drawout type switch gear, rotation of the lead screw (7) is locked automatically at the connected position and the test position of the drawout/push-in unit (R), symbols or marks for representing these positions are provided on an indicator plate (18), which is driven laterally behind the front panel of the circuit breaker by a cam-rod type motion-direction transforming link (23, 19, 21, 18) and is arranged to be visible through display windows (15c) provided on the front panel (15). The insertion of the detachable handle (111) into a polygonal hole (7a) provided on the front end of the lead screw (7) is inhibited by a blocking arm (110a), which is interlocked with a lock plate (16) driven by motion of the drawout/push-in unit (R).

21 Claims, 20 Drawing Sheets

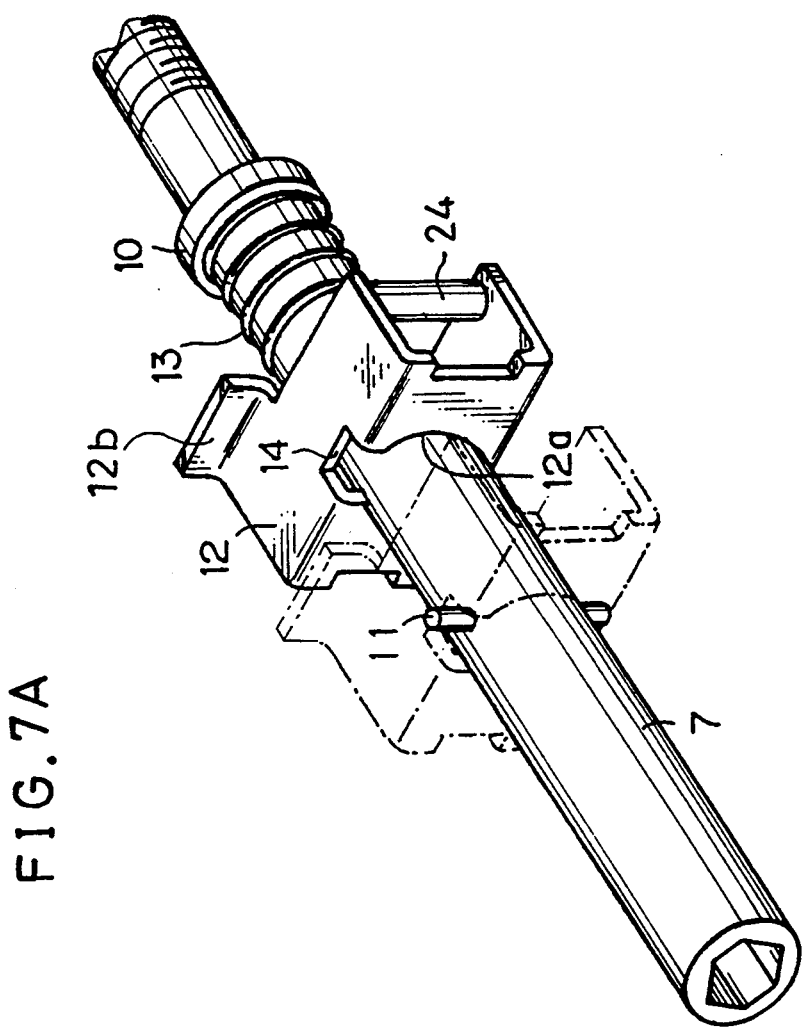

DRAWOUT TYPE SWITCH GEAR

FIELD OF THE INVENTION AND RELATED ART STATEMENT

1. Field of the Invention

The present Invention relates to a drawout type switch gear. More particularly, It is concerned with the drawout type circuit gear composed of a base frame and a circuit breaker movably mounted on the base frame so as to be drawn out of or pushed into the base frame, wherein a disconnected state, a test state and a connected state are determined by the relative positions of the circuit breaker with respect to the base frame.

It further relates to a position locking apparatus for the drawout type switch gear that automatically locks the drawout and push-in operations of the circuit breaker.

It Is further concerned with a drawout-inhibiting apparatus for the drawout type switch gear that inhibits the drawout of the circuit breaker from the base frame in the connected state of the circuit breaker.

2. Description of the Related Art

A drawout type switch gear of this kind is generally provided with a locking mechanism that locks the circuit breaker in the disconnected state, the test state or the connected state for safety or for avoiding an erroneous manipulation. An example of such mechanism is disclosed in Japanese Unexamined Patent Publication (Jikkai) Sho 60-135,011. Further, such drawout type switch gear is also provided with a position display mechanism for displaying the respective states.

In the prior art drawout type switch gear of this kind, the position locking mechanism is however provided separately from the position display mechanism.

Therefore, the prior art drawout type switch gear has a problem in that it is difficult to interlock both of the mechanisms for stabilizing their operation. Another problem inherent to the prior art drawout type switch gear is its high manufacturing cost attributable to the complexity of its structure and large numbers of parts and components that cause difficulty in assembling.

Another problem inherent to the position locking mechanism of the prior art drawout type switch gear is that a manual operation for unlocking the automatically locked mechanism is not usually smooth.

Further, the drawout inhibition mechanism for conventional drawout type switch gear is configured separately from the connecting/disconnecting operation of the circuit breaker so that the drawout of the circuit breaker in its connected state can be inhibited by a separate blocking operation from the connecting/disconnecting operation of the circuit breaker. Thus, conventional switch gear have a complexity in the configuration that hinders miniaturization of the apparatus.

SUMMARY AND OBJECT OF THE INVENTION

The present invention has been made in order to solve the above-mentioned problems, and has, as its object, a provision of a drawout type switch gear which comprises both the locking mechanism and the position indicator mechanism in a simple configuration. The drawout type switch gear also has an improved workability in assembling process and can realize a reduction in manufacturing cost, a stabilization in operation, as well as a high reliability of the manufactured product.

In the present invention, a position locking apparatus for the drawout type switch gear can be structured with the reduced number of the parts and components and the automatic locking operation is more stable.

In addition, in the present invention a position locking apparatus can smoothly unlock the automatically locked apparatus and thus has an excellent operability.

Further, the apparatus of the present invention has a simple structure and small size by interlocking the apparatus with the connecting/disconnecting mechanism of the circuit breaker.

According to the present invention, there is provided a drawout type switch gear including: a base frame, a circuit breaker which is movably mounted on a base frame in a manner to be drawn out or pushed in the base frame when transferred between the drawout position and a pushed-in position, a pair of breaker-side lead conductors provided on the circuit breaker and a pair of base frame-side lead conductors provided on the base frame, wherein the breaker-side lead conductors are arranged to connect to the base frame-side lead conductors in the pushed-in position through a pair of contact fingers provided on the base frame, wherein a drawout type switch gear comprises:
- a drawout/push-in unit which bears the circuit breaker thereon and includes:
- a sleeve nut fixedly mounted on the base frame and has a threaded hole reaching to one end thereof;
- a lead screw which has a male screw part rotatably borne by and to the drawout/push-in unit, in a manner to mate with and in the threaded hole of the sleeve nut by its rotation to effect the push-in or drawout;
- a screw-lock member which is supported by and on the drawout/push-in unit in a matter to be movable lengthwise along an axial direction of the lead screw, thereby to stop the rotation of the lead screw when the screw lock member is urged by a screw-lock spring towards the front panel of the drawout/push-in unit, but to permit the free rotation of the lead screw when the urging is suppressed;
- a lock plate supported by the circuit breaker permitted of its lengthwise movement and biased to the direction towards the front panel of the drawout/push-in unit by a lock plate spring; the lengthwise movement being to be suppressed by a manual pushing of a front end or a distal end of the lock plate in a direction inward with respect to the front panel, and the suppressing being maintained by engaging the distal end with an inner periphery of a slot provided on an indicator plate on the front panel, thereby to suppress the urged movement of the lead screw; and
- a position indicator unit which includes:
- an indicator plate slidably mounted on the front panel of the drawout/push-in unit to be permitted of its lateral movement which represents the relative position of the sleeve nut with respect to the lead screw;
- a connecting rod slidably held by the drawout/push-in unit permitted of its lengthwise displacement along the axial direction of the lead screw, for sensing the relative position as the lengthwise displacement; and
- an indicator cam pivotally supported by the circuit breaker for converting the lengthwise displacement of the connecting rod into the lateral movement of the indicator plate by cam-rod engagement therebetween.

In the above-mentioned drawout type switch gear, the rotation of the lead screw is generally effected by a manipulation of a detachable handle.

In the above-mentioned drawout type switch gear, the lead screw preferably has, at its mid part, a key pin fixed to the lead screw with its axis intersecting perpendicularly to that of the latter, for engagement with a recess provided on the screw lock member, and for inhibiting the lead screw from its rotation at the engagement.

The screw-lock member may have an opening which rotatably accommodating the lead screw therethrough and the recess for engaging with the key pin of the lead screw to stop its rotation.

The lengthwise movement of the screw-lock member may extend to an engaging position whereat the key pin engages with the recess and to a non-engaging position or rotation freeing position whereat it disengages from the key pin, thereby permitting free rotation of the lead screw. Said lengthwise movement of the lock plate is preferably between a pushed-in position corresponding to the non-engaging position of the screw lock member and a projecting-out position corresponding to the engaging, position of the screw lock member. In the pushed-in position, the front end or distal end of the lock plate hardly projects frontward from the front panel of the circuit breaker, i.e., through a slot of an indicator panel, while a proximal or inner end thereof touches a bent-up end provided on the screw lock member thereby to hold the screw lock member to its non-engaging position, against the urging by the screw lock spring. In the locking position, the distal end projects a great deal from the front panel of the circuit breaker while the proximal or inner end stops the holding of the screw lock member. This stop of the holding of the screw lock member permits the screw lock member to move to its engaging position, where the recess of the screw lock member engages with the key pin of the lead screw to stop the rotation of the lead screw.

in the above-mentioned drawout type switch gear, the position indicator unit may further comprise: an indicator panel fixedly provided on the front panel of the drawout/push-in unit and having a slot for permitting the projection of the distal end of the lock plate, a circular opening for permitting the insertion of the detachable handle and a set of display windows wherein:

the connecting rod In the position indicator unit may have a cam engaging end and a straight end; the straight end preferably touch an inner end part of the sleeve nut, so as to be moved with the relative movement of the circuit breaker with respect to the base frame between a test position representing the position just before the test state and a connected position representing the position of the connected state; and the indicator cam has a cam groove with which the cam-engaging end of the connecting rod engages, and further has an interlocking plate pivotally supported by and on the drawout/push-In unit In a coaxial manner with the indicator cam; the indicator plate being engaged with a pin provided on the interlocking plate and linked to the indicator cam by a tension spring, for rendering the conversion of the lengthwise displacement of the connecting rod into the lateral movement of the indicator plate.

In the thus-configured drawout type switch gear, when the distal end or front end of the lock plate is pushed into the slot in the indicator panel against the biasing by the lock plate spring, the screw lock member is urged by the lock plate against the biasing by the screw lock spring and is moved in the direction to part later from the front panel i.e., inward or in the pushing-in direction of the circuit breaker. Since the screw lock member does not engage with the key pin on the lead screw in its engaging position, the circuit breaker can be moved freely between the respective positions by rotating the lead screw by the detachable handle.

On the other hand, when the lock plate is caused to project forward from the slot of the indicator panel by the lock plate spring, the screw lock member is released from the urging by the lock plate and is moved by the screw lock spring towards the front panel. Thereby the recess on the screw lock member engages with the key pin of the lead screw. Then, the lead screw does not rotate, that is, it is locked.

Further, with the displacement of the circuit breaker, the connecting rod is displaced by the displacement of the sleeve nut, which changes its relative position with respect to the main screw. Since the displacement of the connecting rod causes the indicator plate to slide laterally through the motion of the indicator cam, the indicator plate is set to the respective positions thereby to display the corresponding relative positions of the circuit breaker with respect to the base frame.

As above-mentioned, the present invention has an advantage in that the locking mechanism and the position indicator mechanism for the drawout type switch gear can be configured in the simple structure. It is also advantageous in that it can realize a reduction of the manufacturing cost by an improved workability in its assembling process. Attendant advantages of the present invention are the stabilized operation and the high reliability of the obtained products.

According to another aspect of the present invention, there is provided a position locking mechanism for the above-mentioned drawout type switch gear, wherein the indicator plate of the position indicator unit may further comprise:

an aperture having an inner peripheral edge of the cam profile contoured in a manner that; when the position indicator unit occupies the test position or connected position, the distal end of the lock plate does not engage with the peripheral edges of either of the aperture of the indicator plate or of the the slot of the indicator panel, but projects therefrom by being urged by the lock plate spring which automatically has locked the drawout/push-in unit to that position.

In the above-mentioned position locking apparatus for the drawout type switch gear, when the front end of the lock plate is pushed inward against the biasing by the lock plate spring, it is held in its unlocking state (which is pushed-in state) by causing a step in the front or distal end of the lock plate to engage with either of the periphery of the slot of the indicator panel or the periphery of the aperture provided on the indicator plate. Since the screw lock member has been urged inward by the lock plate against the biasing by the screw lock spring, it is moved inward or in the push-in direction by the lock plate. As a result of the holding of the lock plate in the pushed-in or unlocked state, the screw lock member becomes disengaging from the key pin on the lead screw. And, the circuit breaker can be moved freely between the respective positions by rotating the lead screw by the detachable handle.

In case of necessity, the engagement of the front end step of the lock plate with the periphery of the slot or aperture of the indicator panel or plate can be manually released by pushing up the front end by hand.

When the sleeve nut changes its relative position with respect to the lead screw with the movement of the drawout/push-in unit, the connecting rod is pushed and moved by the sleeve nut. The movement of the connecting rod causes the indicator plate to slide laterally, by means of motion direction transfer action of the indicator cam. During the lateral sliding, the step at the front or distal end of the lock plate is gradually lift up by the cam profile provided on the inner periphery of the aperture of the indicator plate. When the indicator plate comes to positions corresponding to the test state and the connected state, the lock plate is forced to project forward from the slot of the indicator panel by the lock plate spring, because the hitherto-existed engagement of step at the front or distal end of the lock plate with any of the slot in the indicator panel and the aperture in the indicator plate is released by the lift-up of the front/distal end. By the forward projection of the lock plate, thus, the screw lock member is released from the urging by the lock plate and is moved forward or toward the front panel, thereby making its recess to engage with the key pin of the lead screw. Thus, the lead screw does not rotate, i.e., it is automatically locked.

As above-described, this aspect of the present invention has an advantage that the position locking apparatus for the drawout type switch gear can be configured in the simple structure by reducing the number of the parts and components compared with the prior art. It is also advantageous in that it can realize a stabilization of the automating position locking and a high reliability of the manufactured products.

The above-mentioned drawout type switch gear may further comprise: a guide member provided on the screw lock member at a position opposite to that of a bent-up end for engaging with the lock plate with regard to the central vertical plane including the axis of the lead screw (7), in a manner that the guide member bridges an upper and a lower horizontal parts of the screw lock member, thereby to guide the screw lock member (12) smoothly along one elongated member of a sub-frame for accommodating the drawout/push-in unit.

In the configuration of the above-mentioned drawout type switch gear, when the lock plate is pushed against the biasing by the lock plate spring for releasing the locking, the sliding movement of the screw lock member is smooth, because the screw lock member does not tilt during its travel along the lead screw owing to the provision of the guide member which effectively suppresses the tilting movement of the screw lock member.

As above-mentioned, the present invention has an advantage that the operability of the drawout type switch gear is much improved, because the unlocking operation by manipulation can be performed smoothly.

According to a further aspect of the present invention there is provided in the drawout type switch gear including a base frame, a circuit breaker movably mounted on the base frame in a manner that it can be drawout or pushed into the base frame between an drawout position and a pushed-in position, a pair of breaker-side lead conductors provided on the circuit breaker and a pair of base frame-side lead conductors provided on the base frame, wherein the breaker-side lead conductors are arranged to connect to the base frame-side lead conductors in the drawout position, through a pair of contact fingers provided on the base frame, a drawout-inhibiting apparatus comprising: a drawout/push-in means which includes;

a sleeve nut fixedly mounted on the base frame; and a lead screw rotatably supported on and by the circuit breaker in its fixed position, in a manner to mate with the sleeve nut upon its rotation by rotation of a detachable handle having a part to fit in a polygonal hole provided on a front end of the lead screw, to effect the push-in or drawout; and an insertion inhibiting unit for inhibiting insertion of the detachable handle from outside into the polygonal hole which includes:

a handle block lever pivotally mounted around its horizontal axis on the circuit breaker, having a blocking arm on one end and a roller on the other, and biased by a return spring in a manner that the blocking arm normally retracts from the front of the polygonal hole but bring itself in front of the polygonal hole when the biasing is suppressed; and a vertical plate held by and on the circuit breaker permitted of a limited vertical movement and interlocked with the connecting/disconnecting operation of the circuit breaker, in a manner that in a connected state of the circuit breaker it can cause the handle block lever to rotate by suppression of the biasing by the return spring thereby to bring the blocking arm in front of the polygonal hole.

In the above-mentioned drawout-inhibiting apparatus for the drawout type switch gear, when the vertical plate, which is interlocked with the connecting/disconnecting mechanism of the circuit breaker, is put down with the connecting operation of the circuit breaker, the handle block lever is caused to rotate against the biasing by the return spring, and its blocking arm is put in front of the polygonal hole of the lead screw, thereby to inhibit the insertion of the detachable handle. In the disconnected state, wherein the vertical plate is lift up, the handle block lever returns by the return spring to cause the blocking arm to leave the front of the polygonal hole, permitting the Insertion of the detachable handle.

As above-described, the drawout-inhibiting apparatus for the drawout type switch gear built in accordance with the present invention has an advantage that it can realize a miniaturization of the apparatus with its simplified structure, by arranging the apparatus to interlock with the connecting/disconnecting mechanism of the circuit breaker.

While the novel features of the present invention are set fourth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 7A is a perspective view showing the positional relation of a key pin 11 and a recess 14 of the screw lock member 12.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

In the following paragraphs, the present invention will be described in more detail by way of example with reference to the preferred embodiments shown in the attached drawings.

EXAMPLE 1

Figure 1:
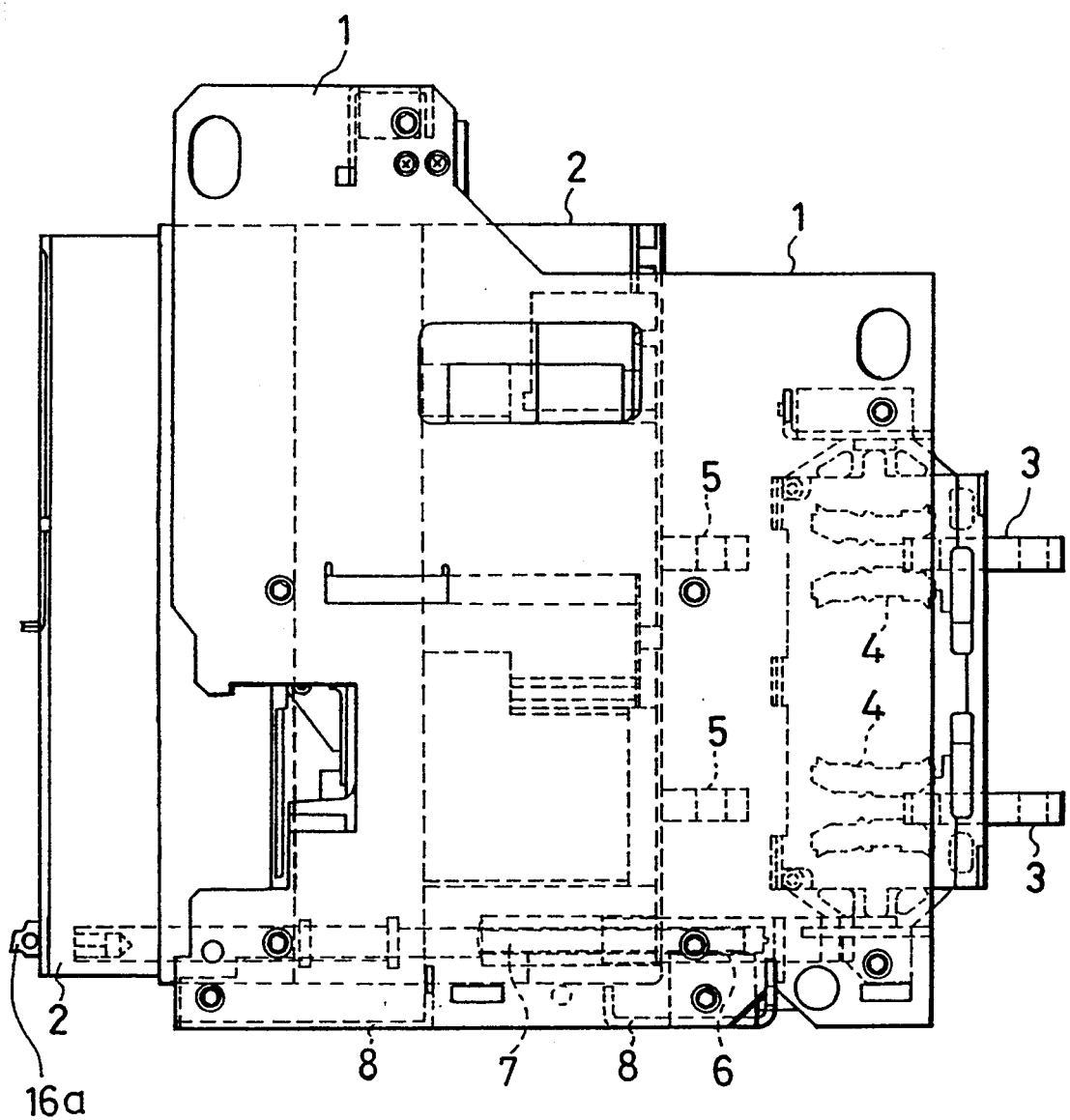
FIG. 1 is a side view of the drawout type switch gear built in accordance with the present invention in its disconnected state.
Figure 2:
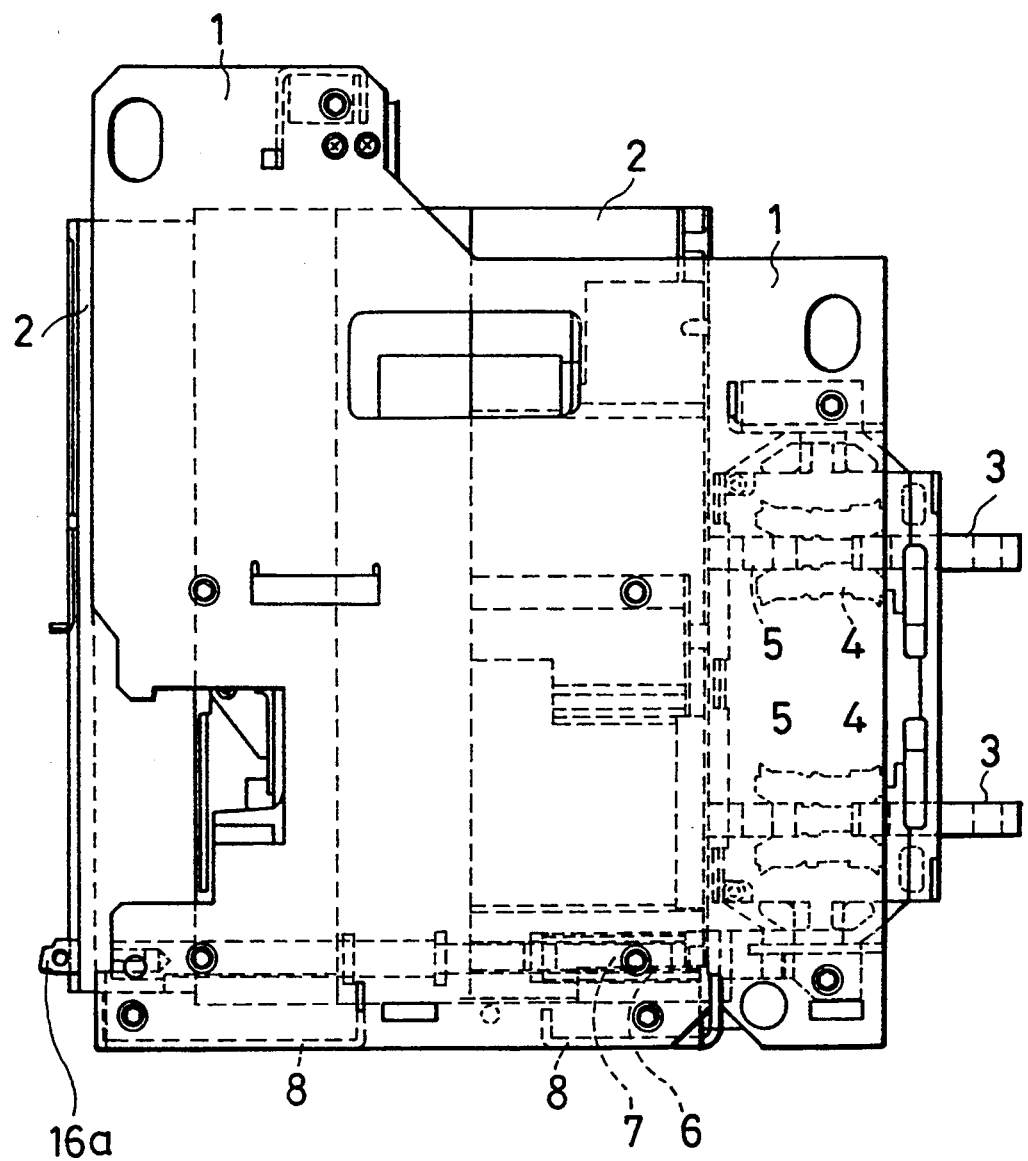
FIG. 2 is a side view of the drawout type switch gear of FIG.1 in its connected state.
Figure 2A:
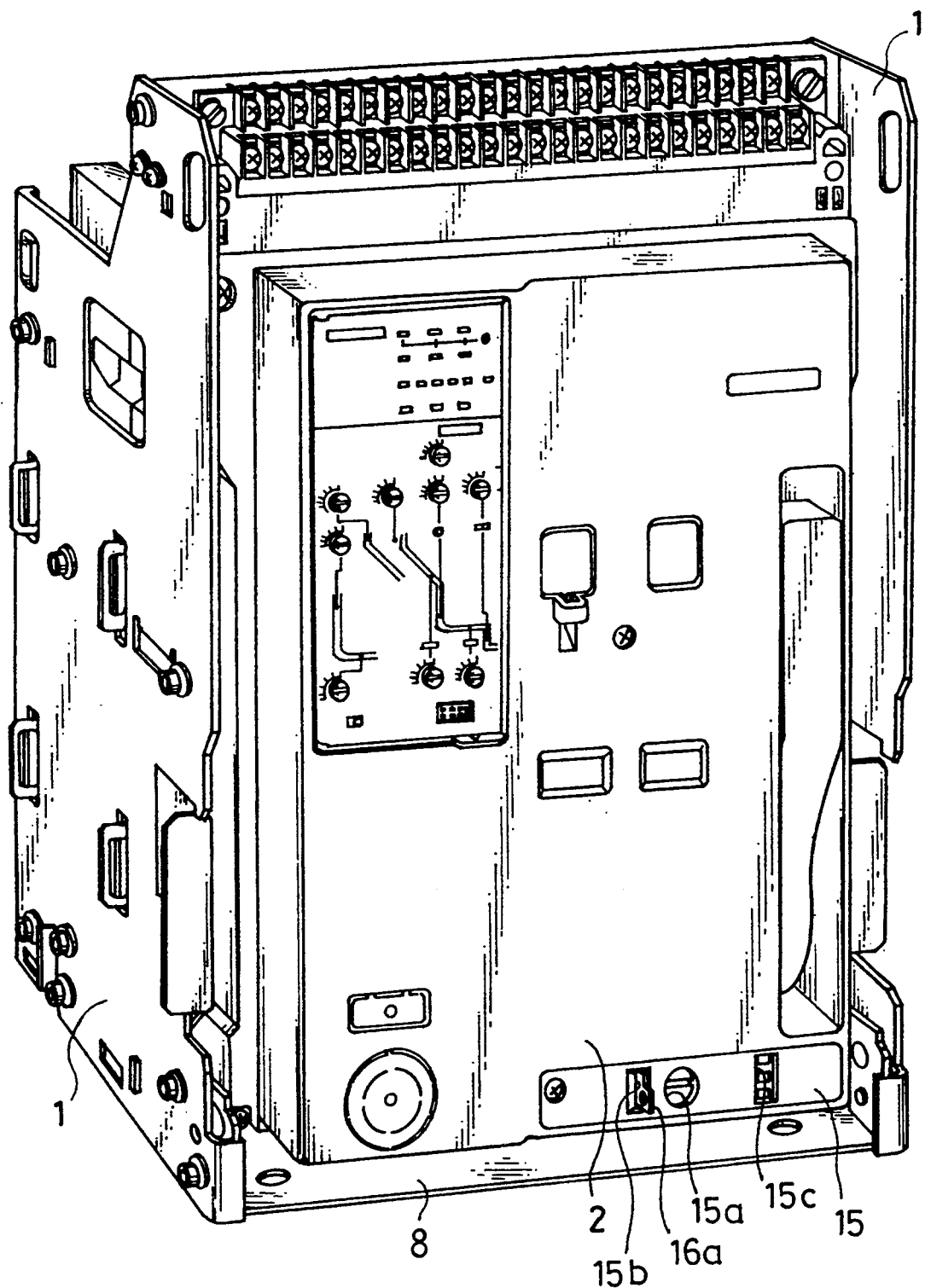
FIG. 2A is a perspective view of the apparatus shown in FIG.2.

FIG. 1 is a schematic side view of the drawout type switch gear in its disconnected state, while FIG. 2 is a schematic side view of that switch gear in its connected state, specifically showing the drawout/push-in unit.

As shown in these figures, a base frame slidably receives a circuit breaker 2 therein in a manner that the circuit breaker 2 can be drawnout from or pushed into the base frame 1 by the operation of the drawout/push-in unit R. A pair of base frame-side lead conductors 3 is provided on the base frame 1, and a pairs of contact fingers 4 are provided on the base frame 1, and a pair of circuit breaker-side lead conductors 5 are provided on the circuit breaker 2.

A sleeve nut 6 which is a female threaded pipe, is fixedly mounted on the base frame 1, and a lead screw 7 which is a male threaded rod is rotatably supported by the circuit breaker 2 at a fixed position of the latter.

Figure 3:
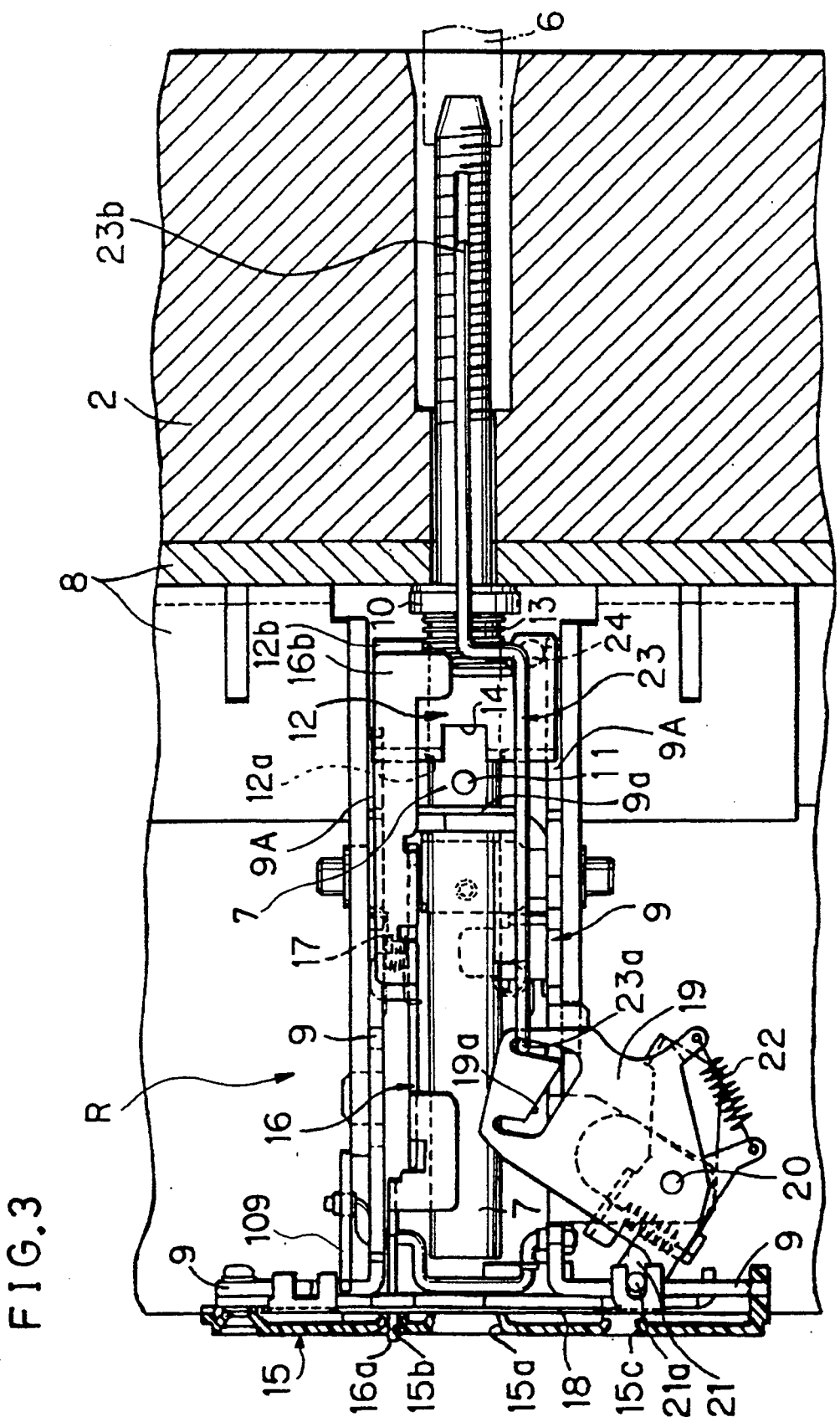
FIG. 3 is a partly cut-out plan view of the drawout type switch gear shown in FIG. 1, representing its drawout/push-in unit in its unlocked state.
Figure 4:
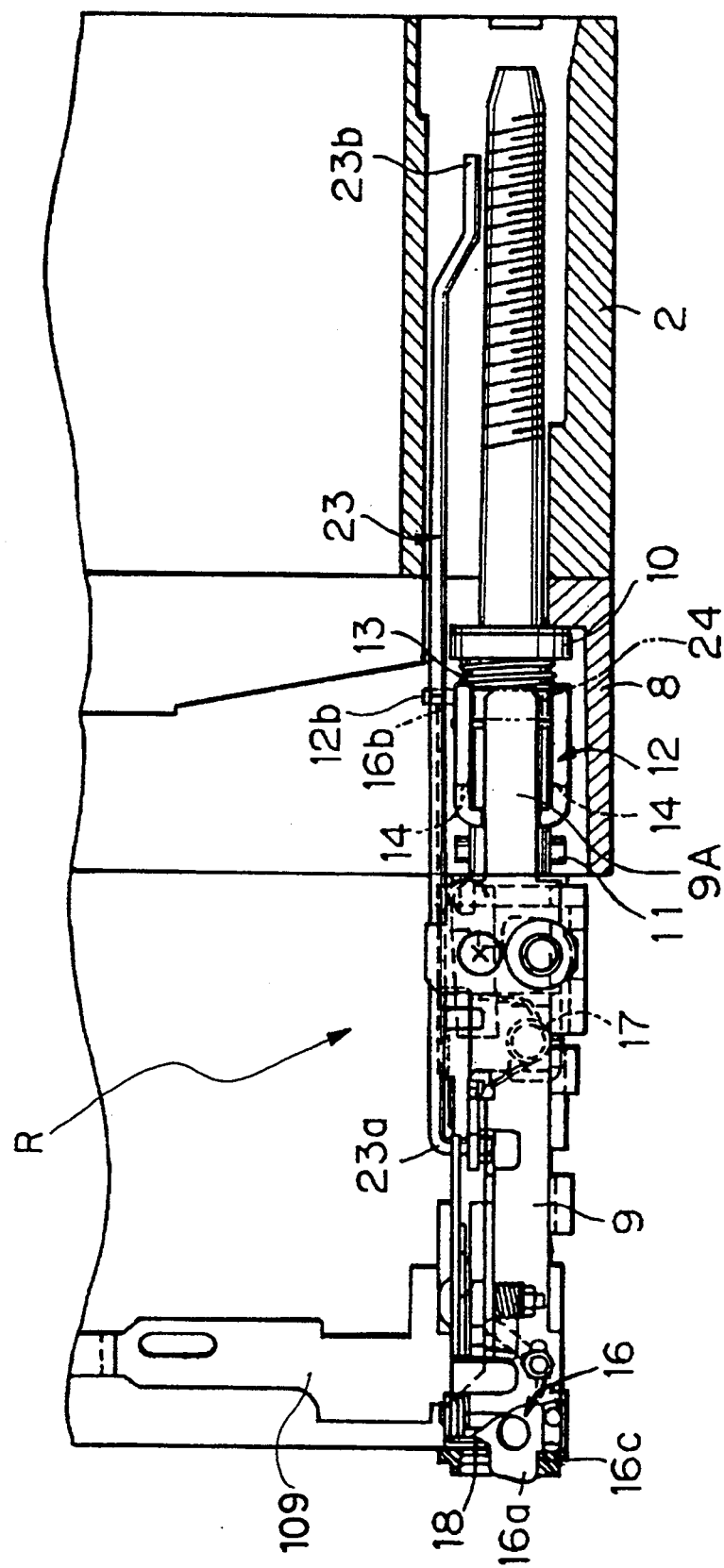
FIG. 4 is a partially cut-out cross-sectional view of the drawout type switch gear corresponding to FIG.3.
Figure 5:
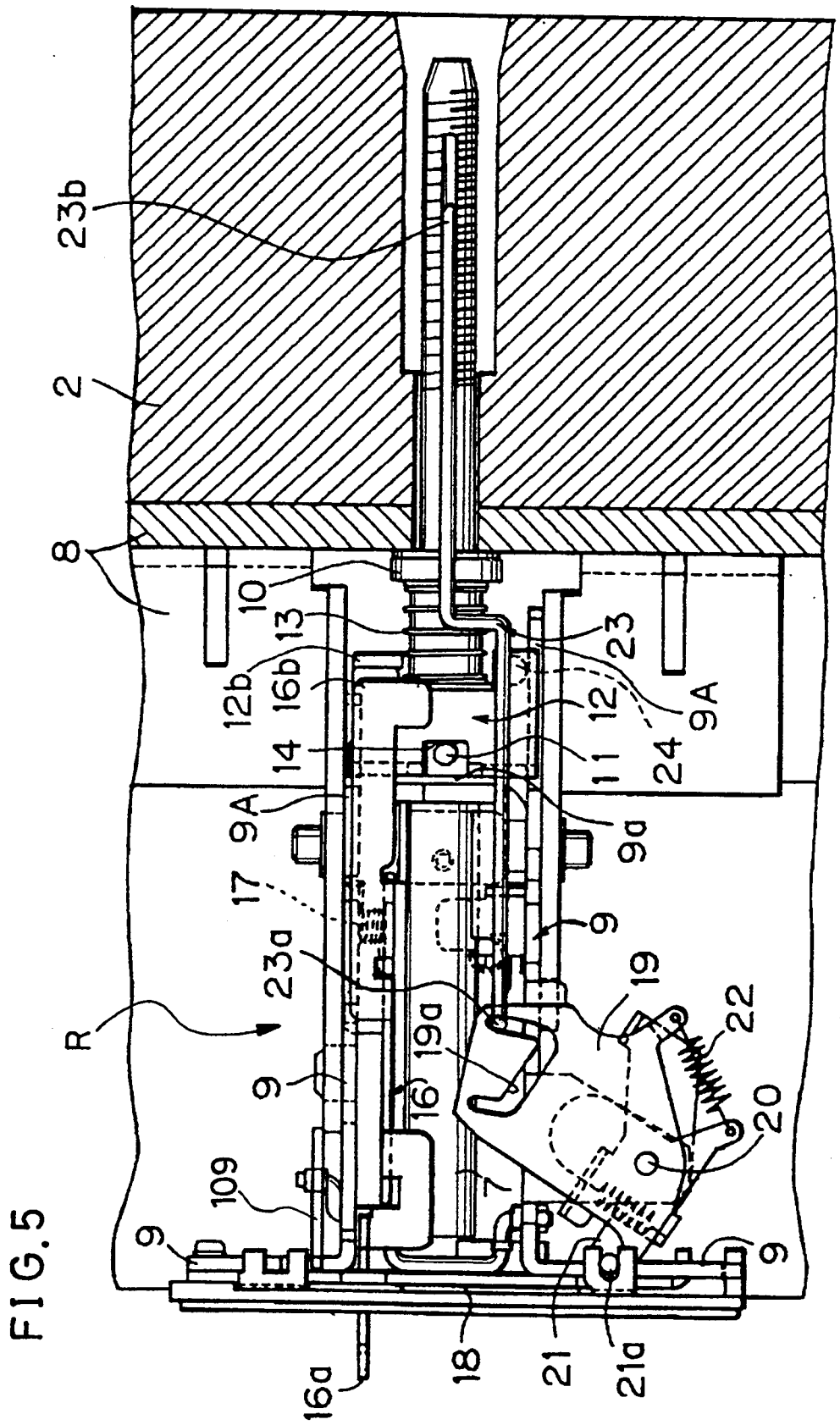
FIG. 5 is a partly cut-out plan view of the drawout type switch gear similar to FIG. 8, with its drawout/push-in unit in the locked state.
Figure 6:
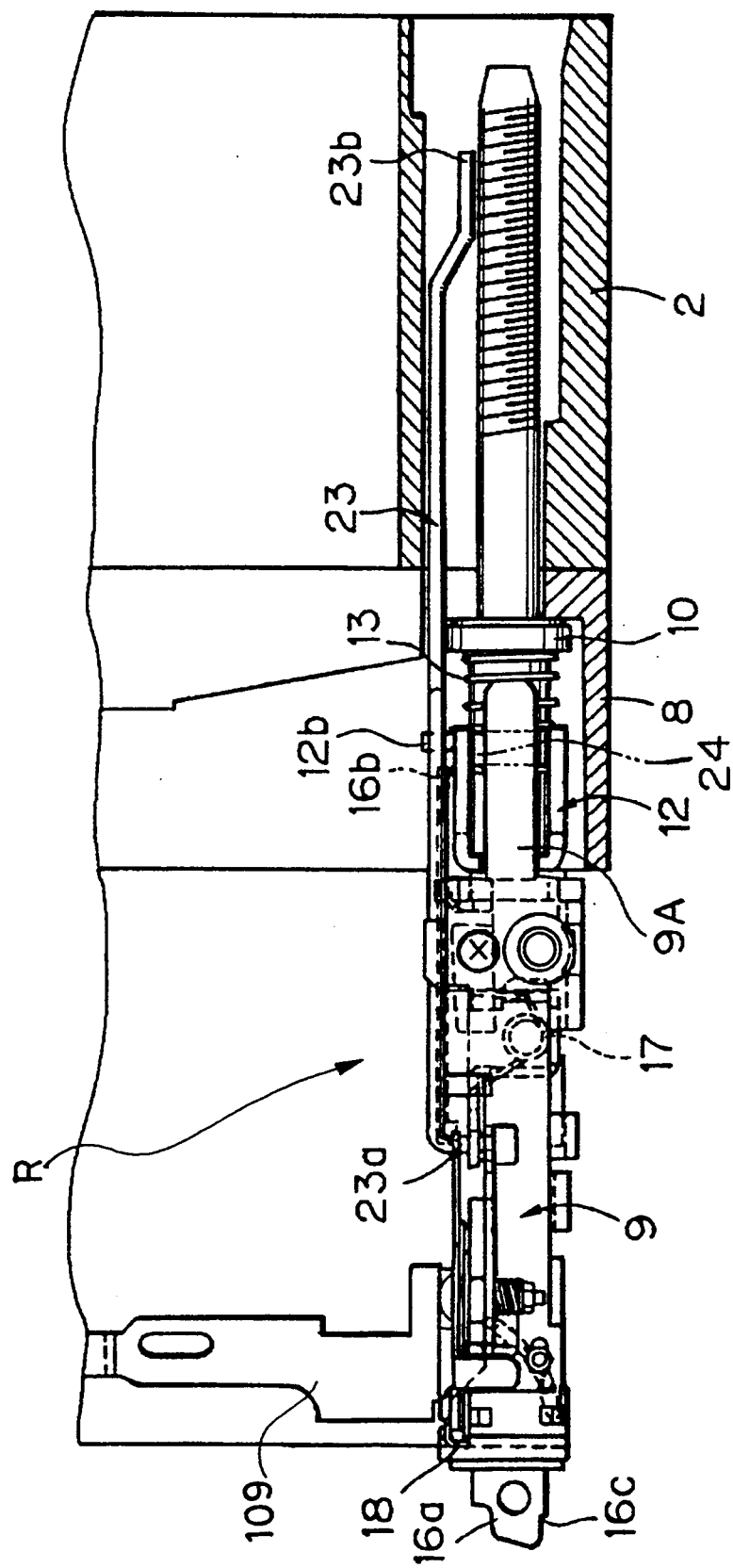
FIG. 6 is a partially cut out cross-sectional view similar to FIG. 4 of the drawout type switch gear, with the locked state of the drawout/push-in unit of FIG. 5.
Figure 7:
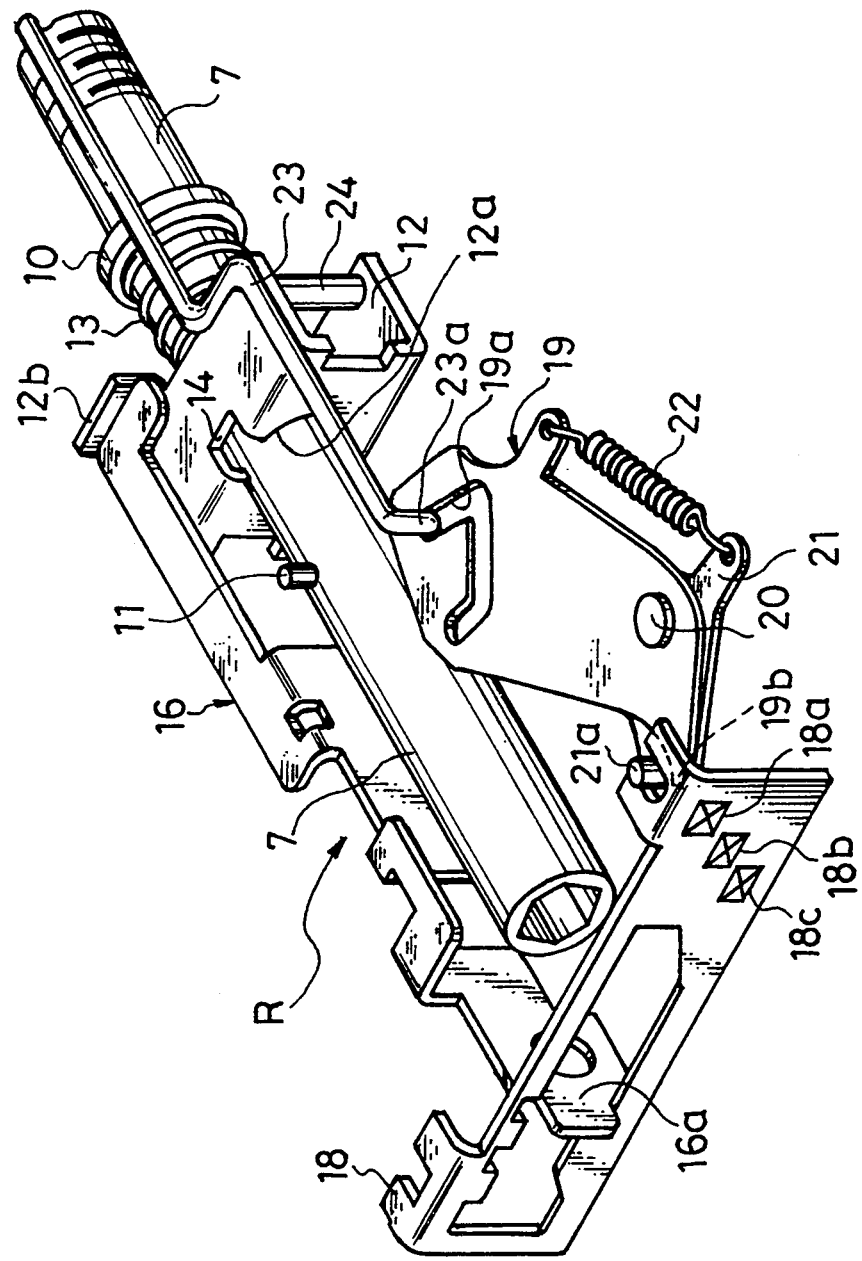
FIG. 7 is a perspective view showing a sleeve nut, a lead screw, a screw lock member, a screw lock spring, a lock plate, an indicator plate, an indicator cam, etc. of the drawout/push-in unit in the drawout type switch gear in accordance with the present invention.
Figure 8:
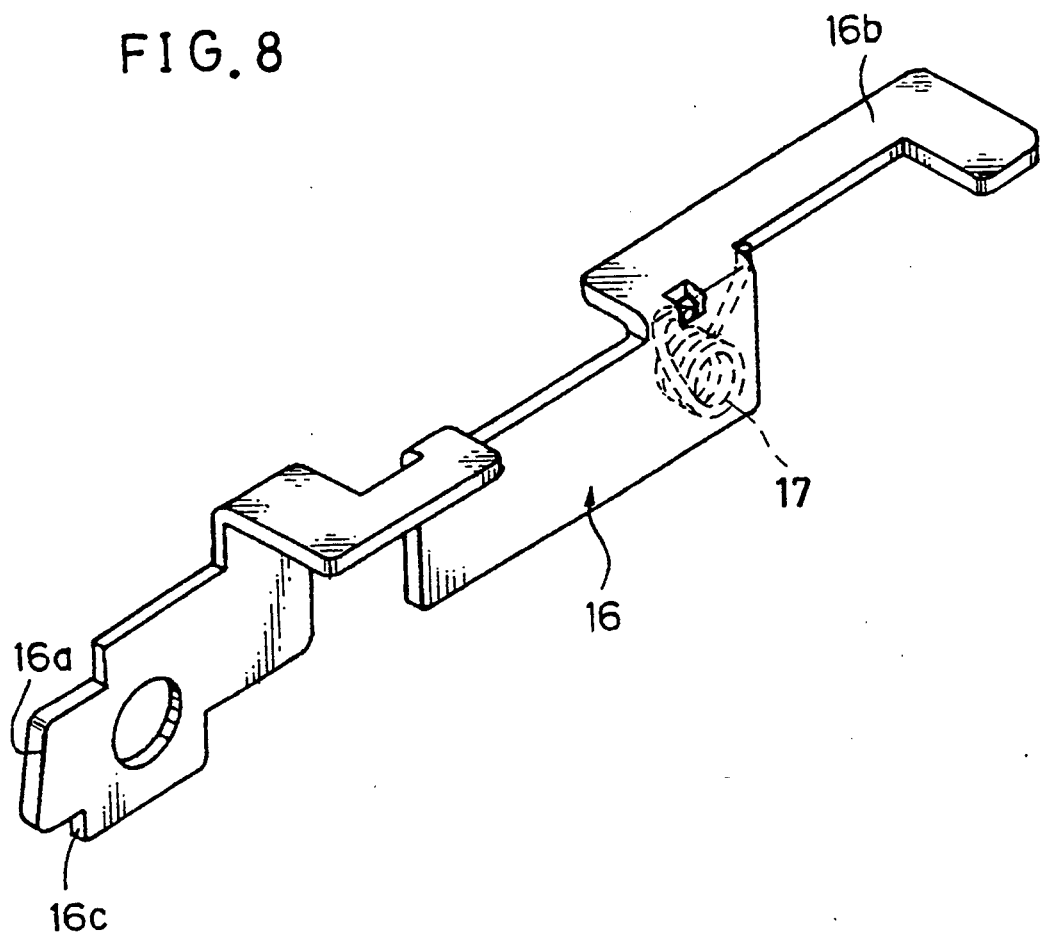
FIG. 8 is a perspective view showing the lock plate of the drawout type switch gear.
Figure 9:
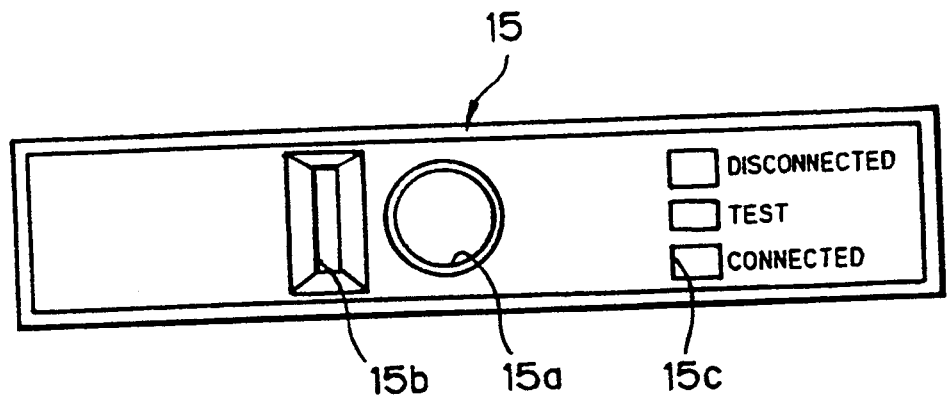
FIG. 9 is a front view of the indicator panel of the drawout type switch gear.
Figure 10:
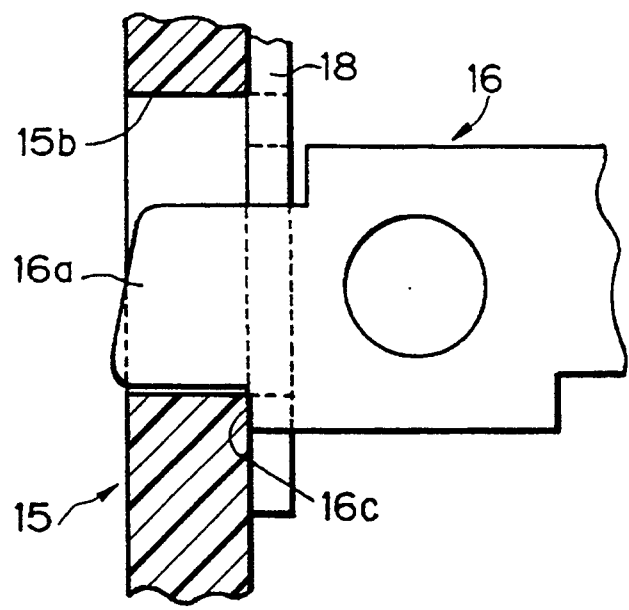
FIG. 10 is a partly-sectional side view showing the relation among the distal end of the lock plate, an aperture in the indicator plate and a slot in the indicator panel of the drawout type switch gear.

FIG. 3 is a partly cut-out plan view of the drawout type switch gear shown in FIG. 1 in its unlocked state, specifically illustrating its drawout/push-in unit R. FIG. 4 is a cross-sectional side view of the part of the unit R shown in FIG. 3. FIG. 5 is a partly cut-out plan view of the drawout/push-in unit R shown in FIG. 3 In its locked state. FIG. 6 is a cross-sectional side view of the part shown in FIG. 5. FIG. 7 is a perspective view showing the relationship among a lead screw, a screw lock member 12, the lead screw 7, a screw lock spring 13 and related component constituting the drawout/push-in unit R and the position indicator unit shown in FIG. 3. FIG. 7A is a perspective view showing the positional relation of a key pin 11 and a recess 14 of the screw lock member 12. FIG. 8 is a perspective view showing a lock plate 16 and the lock plate spring 17 in the drawout/push-in unit R. FIG. 9 is a front view showing an indicator panel 15 of a position indicator unit. FIG. 10 is a partly cross-sectional side view showing the relationship of the state shown in FIG. 4 among a distal end 16a of the lock plate 16, an aperture in an indicator plate 18, and a slot 15b in the indicator panel 15.

As shown in those figures, a frame 8 carrying the circuit breaker 2 has a sub-frame 9 for the drawout/push-in unit R fixed on the frame 8. And a flange 10 formed on a mid part of the main screw 7 engages with the frame 8 and inhibits the lead screw 7 from its forward movement (rightward in FIGS. 3, 4, 5, 6 and 7).

A key pin 11 is provided on the lead screw 7 at a mid position which is behind the flange 10 in a manner that axis of the key pin 11 intersects perpendicular to the axis of the lead screw 7. The flange 10 engages with a crosspiece 9a provided on the sub-frame 9 and inhibits the lead screw 7 from its backward movement (leftward in FIGS. 3, 4, 5, 6 and 7). A screw lock member 12 is held slidably on the sub-frame 9 of the drawout/push-in unit R, permitting lengthwise movement (in the direction of axis of the lead screw 7), and has a circular opening 12a at its center for accommodating the lead screw 7 rotatably and axial movably therethrough.

A screw lock spring 13 is wound around the lead screw 7 in a manner that it can urge the screw lock member 12 against the key pin 11 within a space between the flange 10 and the key pin 11. A recess 14 is provided on a rear part of the screw lock member 12, in a manner to have a positional relationship to permit the engagement of the key pin 11 of the lead screw 7 therewith.

An indicator panel 15 is fixedly provided on the end pieces of the sub-frame 9. The indicator panel 15 has a circular opening 15a at a position corresponding to the main screw 7 to permit the insertion therethrough of a detachable handle (not shown), and also has a slot 15b and three display windows 15c. A lock plate 16 is loosely held in the sub-frame 9 of drawout/push-In unit R to allow lengthwise movement. The lock plate 16 is biased by a lock plate spring 17 in a direction that causes a distal end 16a of the lock plate 16 to project through the slot 15b of the indicator panel.

In a state wherein the projected part of the distal end 16a is pushed into the slot 15b against the biasing by the lock plate spring 17, the lock plate 16 causes its proximal end 16b to hit a bent-up end 12b of the screw lock member 12 and to urge it to move forwards, against the biasing by the screw lock spring 13. The lock plate 16 is held in this state, while a step 16c of the distal end 16a is engaging with the inner peripheral edge of the slot 15b as shown by FIG. 10.

Figure 11:
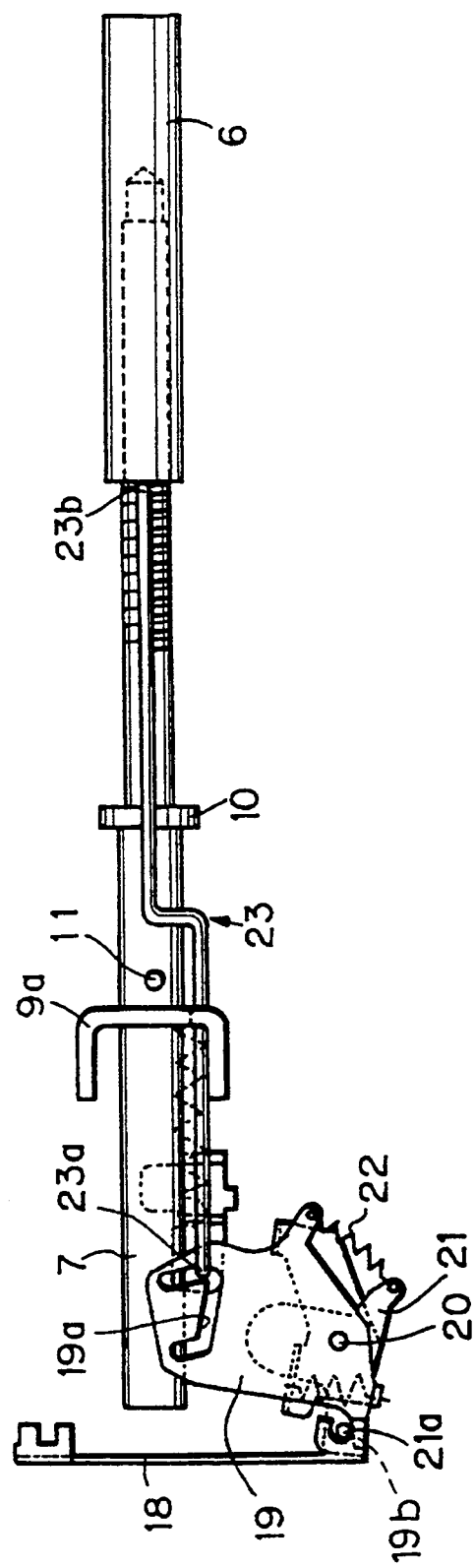
FIG. 11 is a plan view of the assembled members constituting a position indicator unit of the drawout type switch gear, in its test state.
Figure 12:
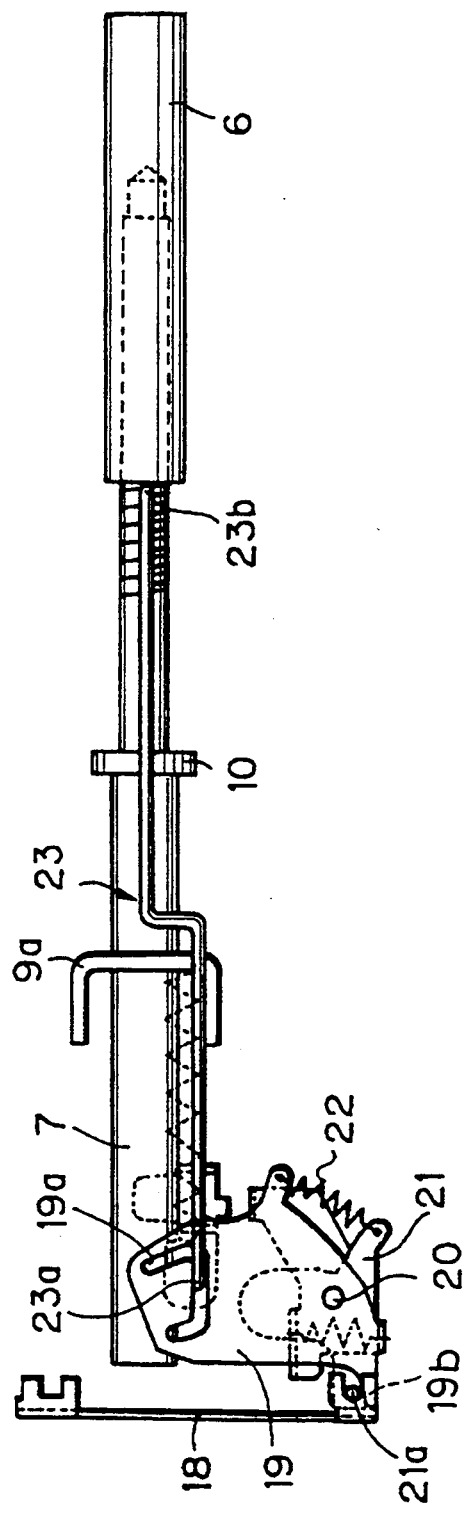
FIG. 12 is a plan view of the position indicator unit of the drawout type switch gear in its intermediate state between the test state and the connected state.
Figure 13:
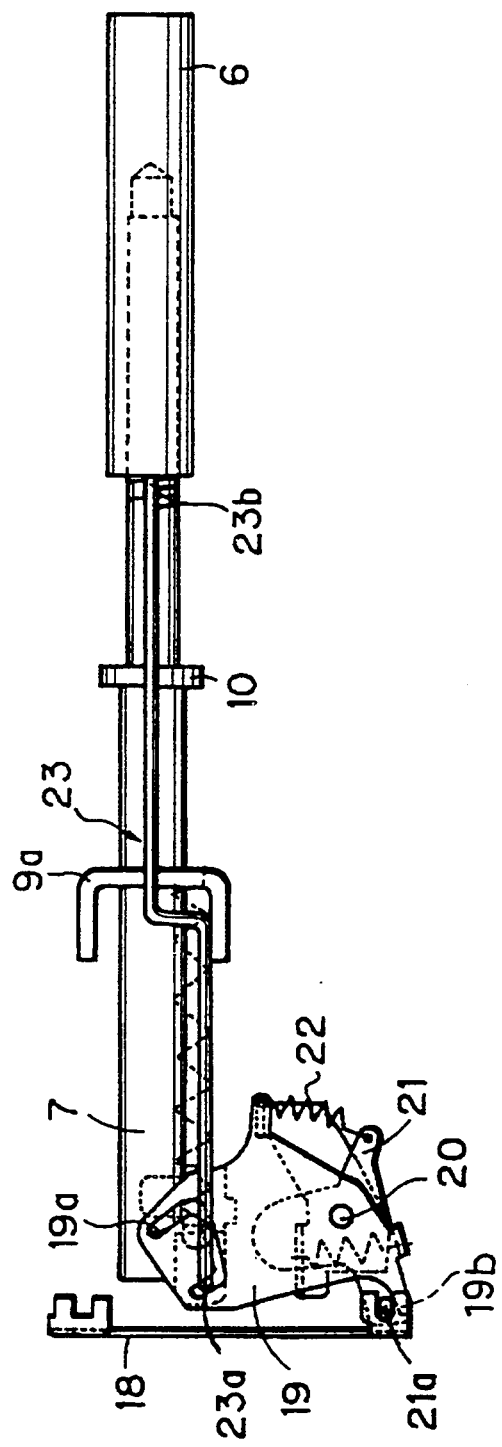
FIG. 13 is a plan view of the position indicator unit of the drawout type switch gear in its connected state.
Figure 14:
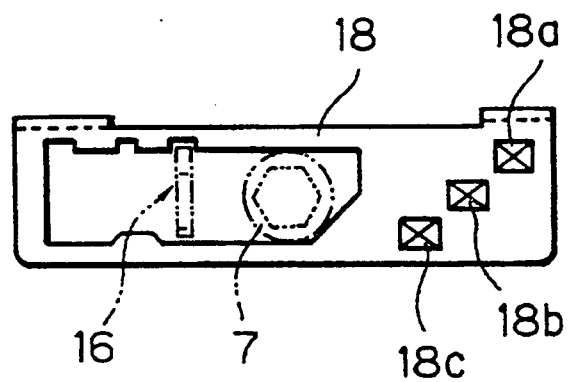
FIG. 14 is a front view of the indicator member of the drawout type switch gear.

FIG. 11 is a plan view of a position indicator unit of the drawout type switch gear shown in FIG. 1 in its test state. FIG. 13 is a plan view similar to FIG. 11 showing the unit in its connected state. FIG. 12 is a plan view similar to FIG. 11 showing the unit in its intermediate state between the test state shown in FIG. 11 and the connected state shown in FIG. 13. FIG. 14 is a front view showing an indicator plate of the position indicator unit.

In these figures, the indicator plate 18 is designed to be laterally slidable along a narrow space formed between the end pieces at the front part of the sub-frame 9 of the drawout/push-in unit R, and the indicator panel 15. The indicator plate 18 is provided with display symbols 18a, 18b and 18c, each representing the disconnected state, the test state and the connected state, respectively, and visible one by one through the display windows 15c of the indicator panel 15 at the corresponding states.

An indicator cam 19 is mounted to be pivotal around a fulcrum pin 20 on the sub-frame 9, and has a slightly open U-shaped cam groove 19a. An interlocking plate 21 is also mounted to be pivotal around a fulcrum pin 20 and has a pin 21a which is engaging with a forked edge provided on the Indicator plate 18. A tension spring 22 biases in a manner that a tip 19b of the indicator cam 19 always engages with and urges a pin 21a on the interlocking plate 21. A connecting rod 23 is disposed along the main screw 7, in a manner permitted of its lengthwise movement. The connecting rod 23 has a cam engaging end 23a which engages with the cam groove 19a of the indicator cam 19, and a straight end 23b which extends close to the tip of the lead screw 7 and has such a positional relationship that it can touch the front end of the sleeve nut 6.

In the following paragraphs, the operation of the thus-configured drawout type switch gear will be described. In the disconnected state of the drawout type switch gear shown in FIG. 1, the lead screw 7 is in the state where the lead screw 7 is going to mate with the sleeve nut 6. And, the straight end 23b of the connecting rod 23 does not touch the front end of the sleeve nut 6 as shown by FIGS. 3 and 4. Therefore, the connecting rod 23, the indicator cam 19, the interlocking plate 21 and indicator plate 18 are in such a state that any of these components does not work and the display symbol representing the disconnected state 18a is still visible through an upper display window 15c of the indicator panel 15.

In this disconnected state, when the front or distal end 16a of the lock plate 16 is urged by the lock plate spring 17, being projected from the slot 15b of the indicator panel 15 as shown by FIGS. 5 and 6, the screw lock member 12 is released from the restriction which had been imposed by the engagement of its bent-up end 12b with the proximal end 16b of the lock plate 16. Thus the screw lock member 12 is urged toward the front panel by the screw lock spring 13, and hence the recess 14 of the screw lock member 12 engages with the key pin 11, as specifically shown by a hypothetical line in FIG. 7A. Thus, the lead screw 7 is now made unable to be rotated by the detachable handle which may be inserted through a circular opening 15a of the indicator panel 15, and the drawout/push-in unit R is locked to this disconnected state.

Starting from this locked state shown in FIGS. 5 and 6, when the distal end 16a of the lock plate 16 is pushed against the biasing by the lock plate spring 17, the distal end 16a is caused to be held in a state wherein the step 16c of the distal end 16a is engaging with the inner peripheral edge of the slot 15b as shown by FIG. 10. In this state shown in FIGS. 5 and 6 of holding the lock plate 16, the proximal or inner end 16b of the lock plate 16 abuts the bent-up end 12b of the screw lock member 12 and urges the screw lock member 12 to move in a direction to part later from the front panel, overcoming the biasing by the screw lock spring 13 as shown by FIGS. 3 and 4, and specifically depicted by the solid line in FIG. 7. Therefore, the engagement of the key pin 11 with the recess 14 is removed and thus there is brought a state wherein the locking is released.

In the disconnected state wherein the locking is released as shown in FIGS. 1, 3 and 4, when the lead screw 7 is rotated in the clockwise direction by the detachable handle, the lead screw 7 is screwed into the sleeve nut 6 and thus the circuit breaker 2 is gradually pushed-in into the base frame 1. During this pushing-in operation, the straight end 23b of the connecting rod 23 touches the sleeve nut 6, and then the connecting rod 23 is caused to be pushed toward the front panel. Thus, the indicator cam 19 and the interlocking plate 21 are rotated anti-clockwise or counterclockwise to cause the indicator member 18 to slide laterally. Therefore, the apparatus becomes to the test state as shown by FIG. 11. In this test state, the display symbol 18b representing the test state shown in FIG. 14 is made visible through a middle display window 15c of the indicator panel 15.

Even in this test state, when the distal end 16a of the lock plate 16 is caused to be projected by the lock plate spring 17, another locked state is brought by the same manipulation as above-mentioned. That is, the drawout type circuit breaker 2 becomes locked to its test state.

In the test state, wherein the locking is released, when the lead screw 7 is rotated again in the clockwise direction, the circuit breaker 2 is further pushed-in into the base frame 1 with the screwing motion of the lead screw 7 into the sleeve nut 6, and the circuit breaker 2 becomes to the connected state as shown by FIG. 2. This state can also be brought by rotating the lead screw 7 continuously from the disconnected state. In this connected state, the circuit breaker-side lead conductors 5 are connected to the base frame-side lead conductors 3 through the contact fingers 4.

In the process of connecting the circuit breaker 2, the connecting rod 23 is pushed gradually forward as shown in FIG. 11, FIG. 12 and FIG. 13. And finally, when the connection is finished, the connecting rod 23 comes to its forward extreme (i.e., nearest to the front panel) as shown in FIG. 13. At that time, both the indicator cam 19 and the interlocking plate 21 have rotated in the counterclockwise direction to their extreme as shown by FIG. 13. Therefore, the indicator plate 18 is slid laterally to its extreme. Thus, the display symbol 18c representing the connected state of the indicator member 18 is made visible through a lower display window 15c of the indicator panel 15.

In this connected state, when the distal end 16a of the lock plate 16 is caused to be projected by the lock plate spring 17, another locked state is brought by the same operation as above-mentioned. That is, the drawout type switch gear can be locked to the connected state.

Starting from the connected state shown in FIG. 2, when the lead screw 7 is rotated in the anti-clockwise direction by the detachable handle, the circuit breaker 2 begins to depart from the base frame 1.

EXAMPLE 2

Figure 16:
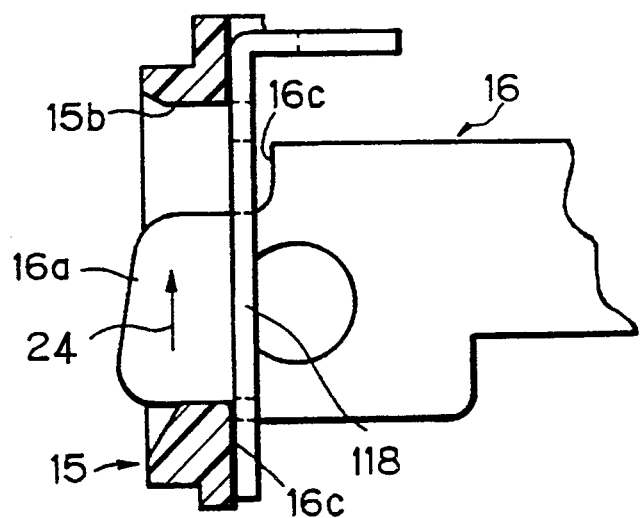
FIG. 16 and 17, each is a partly-sectional view corresponding to position (A) or FIG. 15 (B) of the embodiment of FIG. 15, showing the relationship among the distal end of the lock plate, the aperture in the indicator member and the slot in the indicator panel.
Figure 17:
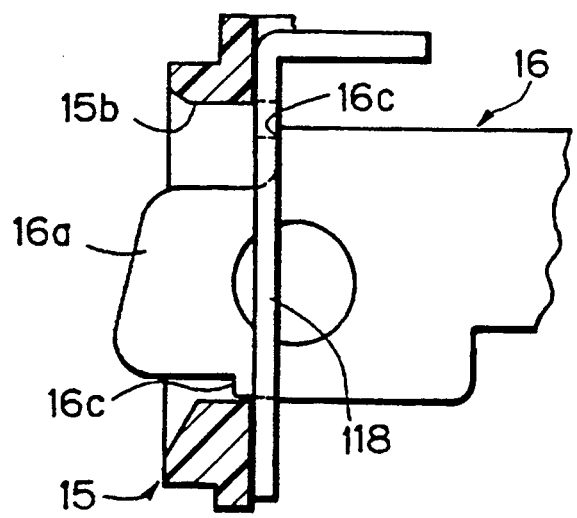

In this Example 2, in place of the indicator plate 18 of Example 1 shown in FIG. 14, another indicator plate 118 having an aperture 118a of a different contour as shown by FIGS. 15 is used. The inner periphery of the aperture 118a is formed to have a cam profile 118A for forcibly moving the lock plate 16. Each front view of the indicator member 118 shown in (A), (B), (C), (D) and (E) of FIG. 15 represents each step of the operation. FIG. 16 is a cross-sectional side view corresponding to FIG. 15 (A); and FIG. 17 is a cross-sectional view corresponding to FIG. 15(B).

In the following paragraphs, the specific operation of the drawout type switch gear characteristic to this embodiment will be described. In the description, the same parts and components as those in the foregoing embodiment will be referred by the same reference numerals and the descriptions identical to the foregoing embodiment will apply similarly and hence will be omitted for avoiding duplicity.

Starting from the disconnected state wherein the locking is released as shown in FIGS. 1, 3, 15(A) and 16, when the lead screw 7 is rotated in clockwise direction by the detachable handle, the lead screw 7 is screwed into the sleeve nut 6 and thus the circuit breaker 2 is gradually pushed into the base frame 1, similarly to the case of Example 1. During this pushing-in operation, the straight end 23b of the connecting rod 23 touches the sleeve nut 6 and the connecting rod 23 is pushed backwards, thus the indicator cam 19 and the interlocking plate 21 are rotated anti-clockwise. This rotation causes the indicator plate 18 to slide laterally, and thus brings the test state as shown by FIG. 11 and FIG. 15(C).

During the period between the disconnected state shown in FIG. 15(A) and just before the test state shown in FIG. 15(C), the step 16c of the distal end 16a of the lock plate 16 engages with the inner peripheral edge of the slot 15b of the indicator panel 15, and subsequently with the inner peripheral edge at the aperture 118a of the indicator plate 118 as shown by FIGS. 15 (B) and 17. Therefore, the lock plate 16 is held in its unlocked state.

Figure 15A:
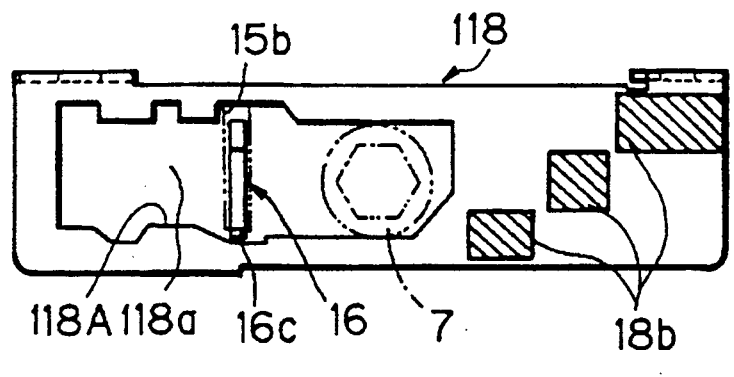
In FIGS. 15, (A), (B), (C), (D) and (E) each is a front view of the indicator member of another embodiment of the drawout type switch gear.
Figure 15B:
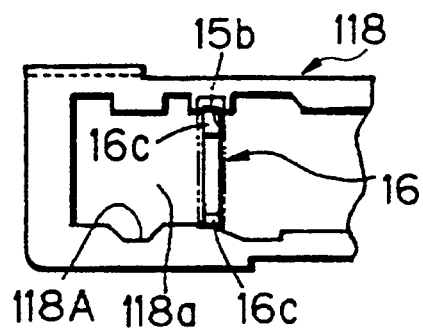
Figure 15C:
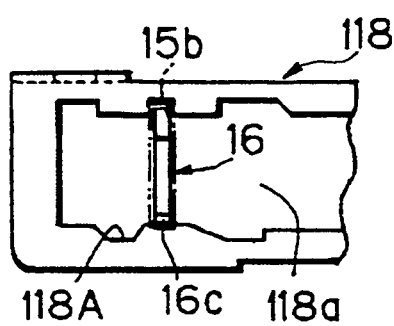
Figure 15D:
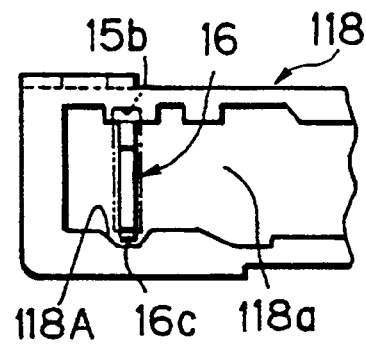

During this period, the distal end 16a of the lock plate 16 is gradually lifted up by a cam profile 118A formed on the inner periphery of the aperture 118a as shown by FIG. 15(B), up to a position corresponding to the test state shown in FIG. 15(C). In the state of FIG. 15 (C), any of the upper and lower steps 16c of the lock plate 16 does not engage with any of the peripheral edges of the slot 15b and of the aperture 118a any longer.

Thus, when the indicator plate 118 slides to the position corresponding to the test state shown in FIG. 15(C), the lock plate 16 forcefully projects through the aperture 118a and from slot 15b, by the force of the lock plate spring 17. And the drawout/push-in unit R of the drawout type switch gear is locked to that state. In this test state, the display symbol 18b representing the test state is made visible through a middle display window 15c of the indicator panel 15.

Figure 15E:
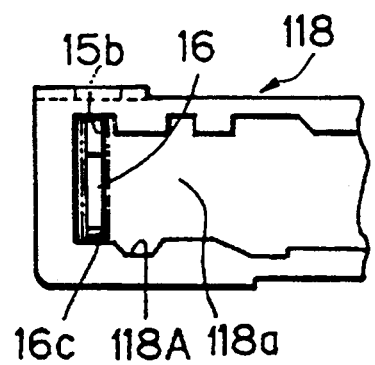

Starting from this test state wherein the locking has been released by pushing the distal end 16a of the lock plate 16 into the slot 15b of the indicator panel, the lead screw 7 is rotated clockwise again, and the circuit breaker 2 is further pushed into the base frame 1 by the screwing rotation of the lead screw 7 into the sleeve nut 6. And, a connected state shown in FIGS. 2, 12 and 15(E) is brought. In this connected state, the circuit breaker-side lead conductors 5 are connected to the base frame-side lead conductors 8 through the contact fingers 4 as in the previous embodiment.

During the period just after the test state shown in FIG. 15 (C) and just before the connected state shown in FIG. 15 (E), the step 16c of the lock plate 16 is engaging with the peripheral edge of the slot 15b as shown in FIG. 15 (D), and hence the lock plate 16 is being held in its unlocked states. And thus, the distal end 16a of the lock plate 16 is gradually lifted up by the cam profile 118A of the indicator member 118. When the distal end 16a comes to the position corresponding to the connected state shown in FIG. 15 (E), the step 16c of the lock plate 16 slides to a position where it does not engage with the periphery of the slot 15b any longer. In other words, when the indicator plate 118 comes to the position corresponding to the connected state shown in FIG. 15 (E), the lock plate 16 also forcefully projects through the aperture 118a and from the slot 15b by the force of the lock plate spring 17. And the drawout/pushin unit R of the drawout type switch gear is locked to the connected state. In this connected state, the display symbol 18c representing the connected state is made visible through the lower display window 15c of the indicator panel 15.

Starting from the connected state where the locking has been released by pushing the distal end 16a of the lock plate 16, when the lead screw 7 is rotated in the anti-clockwise direction by the detachable handle, the circuit breaker 2 begins to depart from the base frame 1 as disclosed in the foregoing embodiment.

EXAMPLE 3

Figure 18:
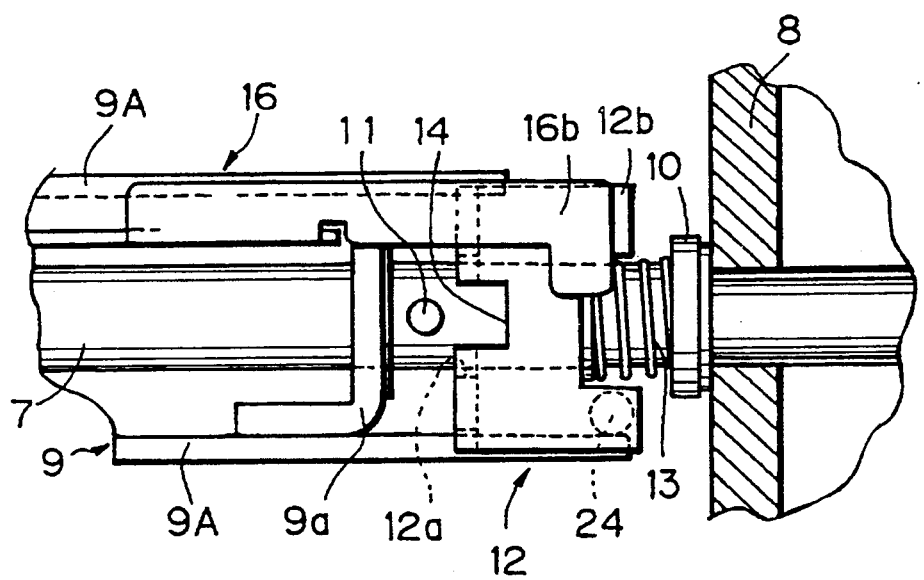
FIG. 18 is a plan view showing a part of a still other embodiment of the drawout/push-in unit in the drawout type switch gear, and specifically indicating the guide member provided on the screw lock member.

In this Example 3, as shown in FIG. 18, a guide member 24 is provided on the screw lock member 12 for improving the latter's sliding motion along an elongated member 9A serving as a rail. FIG. 18 is a plan view showing a part of the drawout/push-in unit R of this embodiment, and specifically the positional relationship between the guide member 24 and the screw lock member 12, and also that between the guide member 24 and the elongated members 9A of the sub-frame 9 for the drawout/push-in unit R. Other configuration and components of the drawout type switch gear than the provision of the guide member 24 is the same as those of the foregoing embodiments and the description thereof is also applicable to this embodiment.

As shown in FIG. 18, the guide member 24 is a vertical rod provided in the screw lock member 12 at the opposite side of a bent-up end 12b of the member 12 with regard to the center axial line of the lead screw 7.

The guide member 24 links the upper and lower horizontal pieces of the screw lock member 12 in a manner that it can slide along the inner surface of one of the elongated members 9A of the sub-frame 9.

In its operation in the disconnected state shown by the solid line in FIGS. 3, 4 and 18, the screw lock member 12 is moved along the elongated member 9A by being guided by the guide member 24, against the biasing by the screw lock spring 13.

When the engagement of the step 16c with the peripheral edge of the slot 15b is released by pushing the distal end 16a of the lock plate 16, the bent-up end 12b provided on one side of the screw lock member 12 is urged forwards by the proximal end 16b along the elongated members 9A of the sub-frame 9. At that time, the screw lock member 12 is tilted with respect to the center axial line of the lead screw 7. Since the screw lock member 12 is tilted with respect to its center axis in this movement by being pushed only at its one side, its movement for releasing the locking is not necessarily smooth because it easily catch the side wall of the subframe 9 if no such guide member 24 is provided. By providing the guide member 24 in the screw lock member 12 at the other side of the screw lock member 16, the undesirable tilting and catching are effectively suppressed by the contact slide of the cylindrical face of the guide member 24 to the inner wall of sub-frame 9. And the the screw lock member 12 can slide along the elongated member 9A of the sub-frame 9, thereby to release the locking smoothly.

EXAMPLE 4

In this Example 4, in addition to the parts and components which have been described with the foregoing embodiments illustrated in FIG. 1 through FIG. 18, the drawout type switch gear contains a drawout-inhibiting apparatus for blocking the insertion of the detachable handle to be used with the drawout/push-in unit R. The detailed parts and component of configuration of the drawout type switch gear other than this drawout-inhibiting apparatus is the same as those of the foregoing embodiments; and the description thereof is also applicable to this embodiment.

In FIGS. 4, 6, 19 and 20, a vertical plate 109 is held by the circuit breaker 2 permitted of a limited vertical movement and interlocked with the operation of the connecting/disconnecting mechanism (not shown in the drawing) of the circuit breaker 2.

Figure 19:
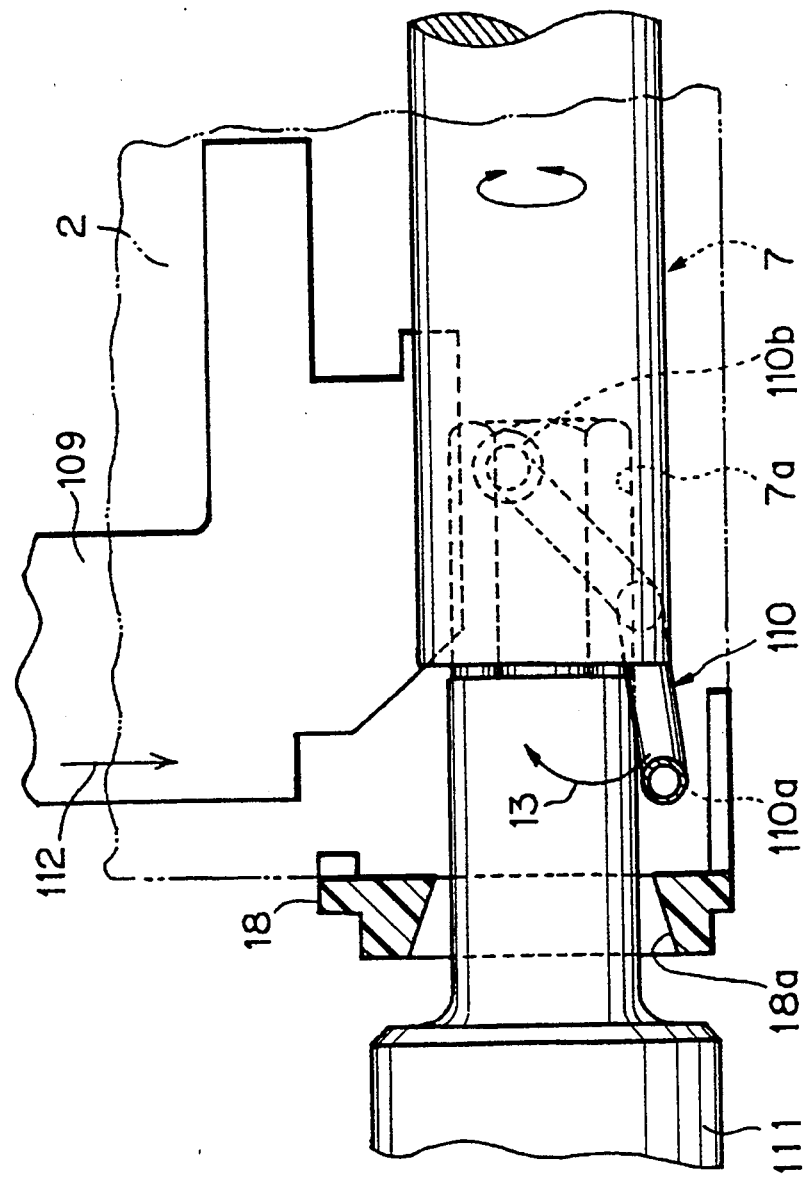
FIGS. 19 and 20, each is a partly cross-sectional side view showing a part of the drawout-inhibiting apparatus in accordance with a further embodiment provided on the drawout/push-in unit.
Figure 20:
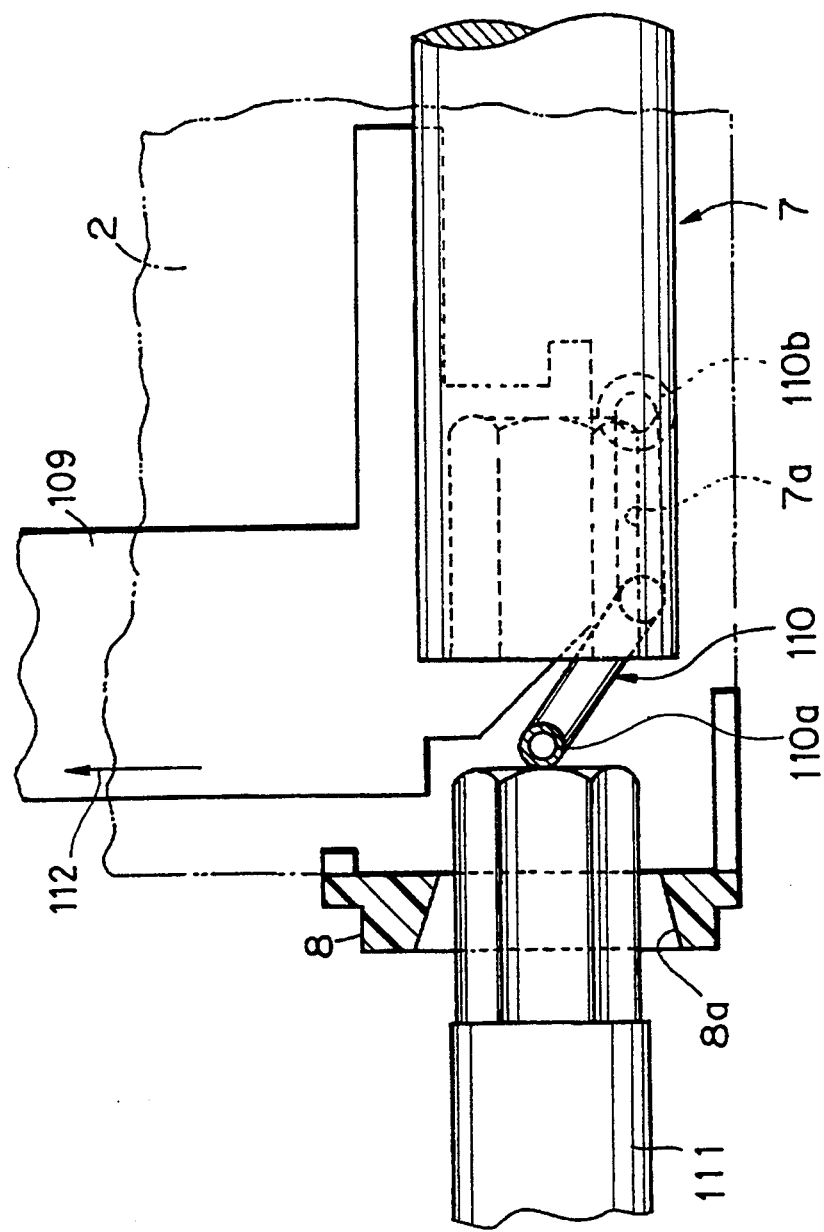

In the cross-sectional view of FIGS. 19 and 20 in particular, a handle block lever 110 is mounted on the circuit breaker 2 pivotally around a horizontal axis and has a blocking arm 110a on one end and a roller 110b on the other, and numeral 111 represents an end of the detachable handle. The handle block lever 110 is biased by a return spring (not shown) in a manner that its blocking arm 110a is normally in its non-blocking position, being out in the front of the hexagonal hole 7a of the lead screw 7. When the vertical plate 109 goes down (for a switching ON operation of the circuit breaker 2), the roller 110b is pushed down by the lower edge of vertical plate 109. Thereby the handle block lever 110 is rotated in the direction shown by an arrow 113 in FIG. 19 against the biasing by the return spring. And the blocking arm 110a presents itself in front of the hexagonal hole 7a of the lead screw 7. Therefore, the handle blocking position is brought.

In the disconnected state of the circuit breaker 2 shown in FIG. 19, the vertical plate 109 is in its upper position, and hence the handle block lever 110 is fixed to its non blocking position. Therefore, the distal end of the detachable handle 111 can be inserted through the circular opening 8a into the hexagonal hole 7a without any hindrance by the blocking arm 110a of the handle block lever 110. And thus the drawout/push-in operation is made possible by manipulating the detachable handle 111 in the state shown in FIG. 19.

Starting from the disconnected state of the circuit breaker 2 shown in FIG. 19, when the circuit breaker 2 comes to its connected state, the vertical plate 109 goes down along the direction shown by an arrow 112 to touch the roller 110b and causes the handle block lever 110 to rotate in the direction shown by an arrow 113. Thus, in the connected state of the circuit breaker 2, the blocking arm 110a of the handle block lever 110 appears in front of the hexagonal hole 7a of the lead screw 7; and the handle blocking position is brought. Therefore, the detachable handle 111 cannot be inserted through the circular opening 8a into the hexagonal hole 7a and thus the inadvertent drawout/push-in operation of the circuit breaker is effectively inhibited.

Although the present invention has been described in terms of the presently preferred embodiments, it is to be understood that disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the scope of the invention as defined by the following claims.

What is claimed is:

1. In a drawout type switch gear including a base frame, a circuit breaker which is movably mounted on said base frame in a manner to be drawn out of or pushed into said base frame when said circuit breaker is transferred between a drawout position and a pushed-in position, a pair of breaker-side lead conductors provided on said circuit breaker and a pair of base frame-side lead conductors provided on said base frame, wherein said breaker-side lead conductors are arranged to connect to said base frame-side lead conductors in said pushed-in position through a pair of contact fingers provided on said base frame, an apparatus comprising:

a drawout/push-in unit which bears said circuit breaker thereon and includes:

a sleeve nut fixedly mounted on said base frame having a threaded hole in one end thereof;

a lead screw which has a male screw part rotatably supported by said drawout/push-in unit for mating with and in said threaded hole of said sleeve nut and for transferring said circuit breaker between said pushed-in position and said drawout position upon rotation of said lead screw;

a screw-lock member which is supported by and on said drawout/push-in unit and movable lengthwise along an axial direction of said lead screw, said screw-lock member stopping the rotation of said lead screw when said screw-lock member is urged by a screw lock spring in a direction towards a front panel of said drawout/push-in unit and permitting the free rotation of said lead screw when said urging is suppressed;

a lock plate supported by said circuit breaker for lengthwise movement and biased toward the front panel of the drawout/push-in unit by a lock plate spring, said lengthwise movement being suppressed by a manual pushing of a distal end of said lock plate in a direction inward with respect to said front panel, said suppression being maintained by engaging said distal end of said lock plate with an inner periphery of a slot provided in an indicator panel on said front panel, thereby to suppress the urged movement of said lead screw; and a position indicator unit which includes:

an indicator plate slidably mounted on the front panel of said drawout/push-in unit said indicator plate being laterally moveable for indicating a relative position of said sleeve nut with respect to said lead screw;

a connecting rod slidably held by said drawout/push-in unit said connecting rod being displaceable lengthwise along an axial direction of said lead screw for sensing said relative position of said sleeve nut in response to lengthwise displacement of said connecting rod; and an indicator cam pivotally supported by the circuit breaker for converting said lengthwise displacement of said connecting rod into the lateral movement of said indicator plate by cam-rod engagement therebetween.

2. The drawout type switch gear in accordance with claim 1, wherein said rotation of said lead screw is adapted to be effected by means of a detachable handle.

3. The drawout type switch gear in accordance with claim 1, wherein;

said lead screw is provided with a key pin for engagement with a recess provided on the screw lock member and for inhibiting said lead screw from rotation when said key pin is engaged with said recess;

said screw-lock member having an opening which rotatably accommodates said lead screw therethrough and includes the recess for engaging with said key pin of said lead screw;

said lengthwise movement of said screw-lock member extending to an engaging position whereat said key pin engages with said recess and to a non-engaging position whereat said recess disengages from said key pin thereby permitting free rotation of said lead screw; and said lengthwise movement of said lock plate being between a pushed-in position corresponding to the non-engaging position of the screw lock member and a projecting-out locking position corresponding to the engaging position of the screw lock member; in said pushed-in position, said distal end of said lock plate hardly projecting from the front panel of said circuit breaker and a proximal end of said lock plate touching a bent-up end provided on the base frame side of said screw lock member thereby holding said screw lock member in said non-engaging position against said urging by said screw lock spring; and in said locking position, said distal end of said lock plate projecting a great deal from said front panel of said circuit breaker and said proximal end of said lock plate pushing said screw lock member into said engaging position wherein the recess of said screw lock member engages with said key pin of said lead screw to stop the rotation of said lead screw.

4. The drawout type switch gear in accordance with claim 1, wherein said position indicator unit further comprises:

an indicator panel fixedly provided on the front panel of said circuit breaker said indicator panel having a slot for permitting the projection of the distal end of said lock plate, a circular opening for permitting the push-in of detachable handle, and a set of display windows; wherein said connecting rod in said position indicator unit has a cam engaging end and a straight end; said straight end engageable with an inner end of said sleeve nut for being displaced with movement of said base frame between a position representing just before test state and a position representing a connected state; and said indicator cam having a cam groove with which said cam-engaging end of the connecting rod engages and an interlocking plate pivotally supported by said drawout/push-in unit in a coaxial manner with said indicator cam; said indicator plate being engaged with a pin provided on said interlocking plate and linked to said indicator cam by a tension spring for smoothly rendering the conversion of said lengthwise displacement of said connecting rod into said lateral movement of the indicator plate.

5. The drawout type switch gear in accordance with claim 4, wherein said indicator plate of said position indicator unit further comprises:

an aperture having an inner peripheral edge which is contoured in a manner that when said position indicator unit occupies one of said test position and said connected position, the distal end of said lock plate does not engage with the peripheral edges of either of the aperture of the indicator plate and said slot of said indicator panel, but projects therefrom by being urged by said lock plate spring for automatically locking said drawout/push-in unit to that position.

6. The drawout type switch gear in accordance with claim 2, wherein;

said lead screw is provided with a key pin for engaging a recess provided on the screw lock member and for inhibiting said lead screw from rotation when said key pin is engaged with said recess;

said screw-lock member having an opening which rotatably accommodates said lead screw therethrough and includes the recess for engaging with said key pin of said lead screw;

said lengthwise movement of said screw-lock member extending to an engaging position whereat said key pin engages with said recess and to a non-engaging position whereat said recess disengages from said key pin thereby permitting free rotation of said lead screw; and wherein said lengthwise movement of said lock plate is between a pushed-in position corresponding to the non-engaging position of the screw lock member and a projecting-out locking position corresponding to the engaging position of the screw lock member; in said pushed-in position, said distal end of said lock plate hardly projecting from the front panel of said circuit breaker and a proximal end of said lock plate touching a bent-up end provided on the base frame side of said screw lock member thereby holding said screw lock member in said non-engaging position against said urging by said screw lock spring; and in said locking position, said distal end of said lock plate projecting a great deal from said front panel of said circuit breaker and said proximal end of said lock plate pushing said screw lock member into said engaging position wherein the recess of said screw lock member engages with said key pin of said lead screw to stop the rotation of said lead screw.

7. The drawout type switch gear in accordance with claim 6, wherein said position indicator unit further comprises:

an indicator panel fixedly provided on the front panel of said circuit breaker, said indicator panel having a slot for permitting the projection of the distal end of said lock plate, a circular opening for permitting the push-in of detachable handle, and a set of display windows; wherein said connecting rod in said position indicator unit has a cam engaging end and a straight end; said straight end engageable with an inner end of said sleeve nut for being displaced with a movement of said base frame between a position representing just before a test state and a position representing a connected state; and said indicator cam having a cam groove with which said cam-engaging end of the connecting rod engages and an interlocking plate pivotally supported by said drawout/push-in unit in a coaxial manner with said indicator cam; said indicator plate being engaged with a pin provided on said interlocking plate and linked to said indicator cam by a tension spring for smoothly rendering the conversion of said lengthwise displacement of said connecting rod into said lateral movement of the indicator plate.

8. The drawout type switch gear in accordance with claim 7, wherein said indicator plate of said position indicator unit further comprises:

an aperture having an inner peripheral edge which is contoured in a manner that when said position indicator unit occupies one of said test position and said connected position, the distal end of said lock plate does not engage with the peripheral edges of either of the aperture of the indicator plate and said slot of said indicator panel, but projects therefrom by being urged by said lock plate spring for automatically locking said drawout/push-in unit to that position.

9. The drawout type switch gear in accordance with claim 2, wherein said position indicator unit further comprises:

an indicator panel fixedly provided on the front panel of said circuit breaker, said indicator panel having a slot for permitting the projection of the distal end of said lock plate, a circular opening for permitting the push-in of detachable handle, and a set of display windows; wherein said connecting rod in said position indicator unit has a cam engaging end and a straight end; said straight end engageable with an inner end of said sleeve nut for being displaced with a movement of said base frame between a position representing just before a test state and a position representing a connected state; and said indicator cam having a cam groove with which said cam-engaging end of the connecting rod engages and an interlocking plate pivotally supported by said drawout/push-in unit in a coaxial manner with said indicator cam; said indicator plate being engaged with a pin provided on said interlocking plate and linked to said indicator cam by a tension spring for smoothly rendering the conversion of said lengthwise displacement of said connecting rod into said lateral movement of the indicator plate.

10. The drawout type switch gear in accordance with claim 9, wherein said indicator plate of said position indicator unit further comprises:

an aperture having an inner peripheral edge which is contoured in a manner that when said position indicator unit occupies one of said test position and said connected position, the distal end of said lock plate does not engage with the peripheral edges of either of the aperture of the indicator plate and said slot of said indicator panel, but projects therefrom by being urged by said lock plate spring for automatically locking said drawout/push-in unit to that position.

11. The drawout type switch gear in accordance with claim 3, wherein said position indicator unit further comprises:

an indicator panel fixedly provided on the front panel of said circuit breaker, said indicator panel having a slot for permitting the projection of the distal end of said lock plate, a circular opening for permitting the push-in of detachable handle, and a set of display windows; wherein said connecting rod in said position indicator unit has a cam engaging end and a straight end; said straight end engageable with an inner end of said sleeve nut for being displaced with a movement of said base frame between a position representing just before a test state and a position representing a connected state; and said indicator cam having a cam groove with which said cam-engaging end of the connecting rod engages and an interlocking plate pivotally supported by said drawout/push-in unit in a coaxial manner with said indicator cam; said indicator plate being engaged with a pin provided on said interlocking plate and linked to said indicator cam by a tension spring for smoothly rendering the conversion of said lengthwise displacement of said connecting rod into said lateral movement of the indicator plate.

12. The drawout type switch gear in accordance with claim 11, wherein said indicator plate of said position indicator unit further comprises:

an aperture having an inner peripheral edge which is contoured in a manner that when said position indicator unit occupies one of said test position and said connected position, the distal end of said lock plate does not engage with the peripheral edges of either of the aperture of the indicator plate and said slot of said indicator panel, but projects therefrom by being urged by said lock plate spring for automatically locking said drawout/push-in unit to that position.

13. The drawout type switch gear in accordance with any one of claims 1–12, further comprising:

a guide member provided on said screw lock member at a position opposite to that of a bent-up edge of said screw lock member for engaging with the lock plate, said guide member bridging an upper piece and a lower piece of said screw lock member and sliding along said base frame for accommodating the drawout/push-in unit.

14. In a drawout type switch gear including a base frame, a circuit breaker movably mounted on said base frame in a manner to be drawn out of or pushed into said base frame when said circuit breaker is transferred between a drawout position and a pushed-in position, a pair of breaker-side lead conductors provided on said circuit breaker and a pair of base frame-side lead conductors provided on said base frame, wherein said breaker-side lead conductors are arranged to connect to said base frame-side lead conductors in said pushed-in position, through a pair of contact fingers provided on said base frame, an apparatus comprising:

a drawout/push-in unit which includes:
- a sleeve nut fixedly mounted on said base frame, and
- a lead screw which has a male screw part rotatably supported by said drawout/push-in unit for mating with and in said threaded hole of sleeve nut said lead screw adapted to be rotatable by operation of a detachable handle wherein a tip of said handle is adapted to fit in a polygonal hole on a front end of said lead screw to effect said push-in or drawout; and an insertion inhibiting unit for inhibiting insertion of said detachable handle from outside into said polygonal hole which includes:
- a handle block lever mounted pivotally on the circuit breaker, said handle block lever having a blocking arm on one end and a roller on the other end, said handle block lever being biased by a return spring to retract from in front of said polygonal hole, said handle block lever extending in front of said hole when said biasing is suppressed; and a plate held by and on said circuit breaker wherein a connected state of said circuit breaker said vertical plate causes said handle block lever to rotate by suppression of said biasing by said return spring and thereby to bring said blocking arm in front of the polygonal hole.

15. A drawout type switch gear, comprising: a frame;
- a circuit breaker slidably mounted in said frame, said circuit breaker including a panel;
- a first screw member fixedly secured to said frame;
- a second screw member rotatably supported by said circuit breaker for mating with said first screw member and urging said circuit breaker to slide upon said frame upon rotation of said second screw member;
- a key pin extending from a surface of said second screw member;
- a screw lock member slidably mounted on said second screw member for releaseably engaging said key pin and preventing rotation of said lead screw when said second screw member is engaged with said key pin;
- a lock plate slidably supported by said circuit breaker for lengthwise movement relative to said circuit breaker, said lock plate having a first end protrudable through an opening in said panel of said circuit breaker and a second end abutting against said screw lock member; and
- means for urging said screw lock member into abutment with said key pin.

16. The drawout type switch gear in accordance with claim 15 wherein said first screw member includes a sleeve nut and said second screw member includes a lead screw.

17. The drawout type switch gear in accordance with claim 15, further including means for guiding said screw lock member to slide substantially parallel to an axis of said second screw member.

18. The drawout type switch gear in accordance with claim 15, wherein said lock plate is rotatably supported by said circuit breaker for rotational movement relative to said circuit breaker, said first end of said lock plate having at least one notched portion for engaging an edge of said panel opening upon being slid into and rotated inside of said circuit breaker.

19. The drawout type switch gear in accordance with claim 15, further comprising:
- an indicator plate slidably mounted on said panel;
- a connecting rod slidably mounted in said circuit breaker for lengthwise displacement relative to said second screw member, said connecting rod having a first end abutting said sleeve nut; and
- cam means, connected to a second end of said rod, for converting said lengthwise displacement of said rod to a sliding of said indicator plate.

20. The drawout type switch gear in accordance with claim 15, wherein said indicator plate includes a contoured aperture for receiving said first end of said lock plate, said first end of said lock plate including at least one notched portion for abutting a convex portion of said aperture and preventing first end of said lock plate from being urged through said opening in said panel.

21. The drawout type switch gear in accordance with claim 15, wherein said second screw member includes means for receiving a detachable handle for rotating said second screw member and wherein said circuit breaker includes means for blocking attachment of said handle when said circuit breaker is energized.

* * * * *